(12) United States Patent
Rajamani et al.

(10) Patent No.: US 9,582,238 B2
(45) Date of Patent: Feb. 28, 2017

(54) DECOMPOSED MULTI-STREAM (DMS) TECHNIQUES FOR VIDEO DISPLAY SYSTEMS

(75) Inventors: Krishnan Rajamani, San Diego, CA (US); Xiaodong Wang, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 12/966,495

(22) Filed: Dec. 13, 2010

(65) Prior Publication Data

US 2011/0145879 A1 Jun. 16, 2011

Related U.S. Application Data

(60) Provisional application No. 61/286,287, filed on Dec. 14, 2009.

(51) Int. Cl.
*H04N 7/12* (2006.01)
*G06F 3/14* (2006.01)
(Continued)

(52) U.S. Cl.
CPC .......... *G06F 3/1454* (2013.01); *H04L 65/607* (2013.01); *G06F 3/14* (2013.01);
(Continued)

(58) Field of Classification Search
USPC ....................................... 375/240.01, 240.26
See application file for complete search history.

(56) References Cited

U.S. PATENT DOCUMENTS

| 4,791,554 A | 12/1988 | Hirota et al. |
| 5,828,370 A | 10/1998 | Moeller et al. |

(Continued)

FOREIGN PATENT DOCUMENTS

| CN | 1437355 A | 8/2003 |
| CN | 1561609 A | 1/2005 |

(Continued)

OTHER PUBLICATIONS

Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.

(Continued)

*Primary Examiner* — Tracy Y. Li
(74) *Attorney, Agent, or Firm* — Campbell C. Chiang

(57) ABSTRACT

This disclosure describes techniques that can improve the generation of a decomposed multi-stream (DMS) by a host device of a video display system and the display of a DMS by a client device of the video display system. The techniques may apply different frame rates to different streams within a DMS, and the frame rates may depend on the content. For example, one stream within a DMS may comprise a sequence of full-motion video information, which may be rendered at a relatively high frame rate. However, another stream within the DMS may be associated with a background of the display, various graphic user interface control windows or elements, or a display window that includes non-video content (such as e-mail or a document). The second stream in the DMS may be rendered at a much slower frame rate than that used for the sequence of full-motion video information.

44 Claims, 11 Drawing Sheets

(51) Int. Cl.
*H04L 29/06* (2006.01)
*G09G 5/14* (2006.01)

(52) U.S. Cl.
CPC .......... *G09G 5/14* (2013.01); *G09G 2310/04* (2013.01); *G09G 2320/0613* (2013.01); *G09G 2320/10* (2013.01); *G09G 2340/02* (2013.01); *G09G 2350/00* (2013.01); *G09G 2352/00* (2013.01); *G09G 2370/16* (2013.01)

(56) References Cited

U.S. PATENT DOCUMENTS

| | | |
|---|---|---|
| 5,835,723 A | 11/1998 | Andrews et al. |
| 5,925,137 A | 7/1999 | Okanoue et al. |
| 6,014,706 A | 1/2000 | Cannon et al. |
| 6,049,549 A | 4/2000 | Ganz et al. |
| 6,195,680 B1 | 2/2001 | Goldszmidt et al. |
| 6,252,889 B1 | 6/2001 | Patki et al. |
| 6,266,690 B1 | 7/2001 | Shankarappa et al. |
| 6,400,720 B1 | 6/2002 | Ovadia et al. |
| 6,424,626 B1 | 7/2002 | Kidambi et al. |
| 6,515,992 B1 | 2/2003 | Weston et al. |
| 6,594,699 B1 | 7/2003 | Sahai et al. |
| 6,608,841 B1 | 8/2003 | Koodli |
| 6,748,195 B1 | 6/2004 | Phillips |
| 6,760,772 B2 | 7/2004 | Zou et al. |
| 6,801,530 B1 | 10/2004 | Brandt et al. |
| 6,876,857 B1 | 4/2005 | Nee et al. |
| 6,917,976 B1 | 7/2005 | Slaughter et al. |
| 6,963,921 B1 | 11/2005 | Yang et al. |
| 7,035,281 B1 | 4/2006 | Spearman et al. |
| 7,072,984 B1 | 7/2006 | Polonsky et al. |
| 7,080,151 B1 | 7/2006 | Borella et al. |
| 7,085,420 B2 * | 8/2006 | Mehrotra ................... 382/232 |
| 7,293,066 B1 * | 11/2007 | Day ................... G06Q 30/0603 709/213 |
| 7,324,462 B1 | 1/2008 | Page et al. |
| 7,328,021 B1 | 2/2008 | Satapathy |
| 7,333,464 B2 | 2/2008 | Yang et al. |
| 7,366,204 B2 | 4/2008 | Kang et al. |
| 7,373,415 B1 | 5/2008 | DeShan et al. |
| 7,376,155 B2 | 5/2008 | Ahn et al. |
| 7,477,659 B1 | 1/2009 | Nee et al. |
| 7,519,470 B2 | 4/2009 | Brasche et al. |
| 7,529,823 B2 | 5/2009 | Trufinescu et al. |
| 7,565,357 B2 | 7/2009 | Rao |
| 7,688,859 B2 | 3/2010 | Chen et al. |
| 7,696,980 B1 | 4/2010 | Piot et al. |
| 7,712,670 B2 | 5/2010 | Sauerwein, Jr. et al. |
| 7,716,385 B2 | 5/2010 | Saint-Hilaire et al. |
| 7,719,972 B2 | 5/2010 | Yuan et al. |
| 7,720,096 B2 | 5/2010 | Klemets |
| 7,768,536 B2 | 8/2010 | Hyatt |
| 7,835,406 B2 | 11/2010 | Oran et al. |
| 7,868,890 B2 | 1/2011 | Ludwin et al. |
| 7,881,315 B2 | 2/2011 | Haveson et al. |
| 1,007,247 A1 | 3/2011 | Funabiki et al. |
| 7,929,475 B2 | 4/2011 | Simonson et al. |
| 1,020,543 A1 | 8/2011 | Altmann |
| 8,001,384 B2 | 8/2011 | Yamamoto et al. |
| 8,102,849 B2 | 1/2012 | Martinez Bauza et al. |
| 8,157,168 B2 | 4/2012 | Sauerwein, Jr. et al. |
| 8,364,201 B1 | 1/2013 | Fujisaki |
| 8,406,961 B2 | 3/2013 | Pathak et al. |
| 8,428,048 B2 | 4/2013 | Walker et al. |
| 8,437,347 B2 | 5/2013 | Casaccia et al. |
| 8,466,870 B2 | 6/2013 | Cohen et al. |
| 8,517,251 B2 | 8/2013 | Cohen et al. |
| 8,593,996 B2 | 11/2013 | Lee et al. |
| 8,605,048 B2 | 12/2013 | Ye et al. |
| 8,605,584 B2 | 12/2013 | Leung et al. |
| 8,612,619 B2 | 12/2013 | Guo et al. |
| 8,724,696 B2 | 5/2014 | Byford et al. |
| 8,966,131 B2 | 2/2015 | Huang et al. |
| 2002/0007494 A1 * | 1/2002 | Hodge ................... 725/109 |
| 2002/0035621 A1 | 3/2002 | Zintel et al. |
| 2002/0097718 A1 | 7/2002 | Korus et al. |
| 2003/0031152 A1 | 2/2003 | Gohda et al. |
| 2003/0064752 A1 | 4/2003 | Adachi et al. |
| 2003/0110297 A1 | 6/2003 | Tabatabai et al. |
| 2003/0142631 A1 | 7/2003 | Silvester |
| 2003/0152098 A1 | 8/2003 | Zhu |
| 2003/0167171 A1 | 9/2003 | Calderone et al. |
| 2003/0225737 A1 | 12/2003 | Mathews |
| 2004/0039934 A1 | 2/2004 | Land et al. |
| 2004/0071169 A1 | 4/2004 | Abe et al. |
| 2004/0083284 A1 | 4/2004 | Ofek et al. |
| 2004/0103282 A1 | 5/2004 | Meier et al. |
| 2004/0147264 A1 | 7/2004 | Ogawa |
| 2004/0160967 A1 | 8/2004 | Fujita et al. |
| 2004/0202249 A1 | 10/2004 | Lo et al. |
| 2004/0214571 A1 | 10/2004 | Hong |
| 2005/0021810 A1 | 1/2005 | Umemura et al. |
| 2005/0044142 A1 | 2/2005 | Garrec et al. |
| 2005/0058090 A1 | 3/2005 | Chang et al. |
| 2005/0060750 A1 | 3/2005 | Oka et al. |
| 2005/0085239 A1 | 4/2005 | Cedervall |
| 2005/0096086 A1 | 5/2005 | Singamsetty |
| 2005/0102699 A1 | 5/2005 | Kim et al. |
| 2005/0111361 A1 | 5/2005 | Hosein |
| 2005/0130611 A1 | 6/2005 | Lu et al. |
| 2005/0136990 A1 | 6/2005 | Hardacker et al. |
| 2005/0138193 A1 | 6/2005 | Encarnacion et al. |
| 2005/0144225 A1 | 6/2005 | Anderson et al. |
| 2005/0149976 A1 | 7/2005 | Lupoi et al. |
| 2005/0152330 A1 | 7/2005 | Stephens et al. |
| 2005/0166241 A1 | 7/2005 | Kim et al. |
| 2005/0175321 A1 | 8/2005 | Aridome et al. |
| 2005/0176429 A1 | 8/2005 | Lee et al. |
| 2005/0198663 A1 | 9/2005 | Chaney et al. |
| 2005/0219266 A1 | 10/2005 | Koutani et al. |
| 2005/0266798 A1 | 12/2005 | Moloney et al. |
| 2005/0267946 A1 | 12/2005 | An et al. |
| 2006/0002320 A1 | 1/2006 | Costa-Requena et al. |
| 2006/0002395 A1 | 1/2006 | Araki et al. |
| 2006/0013182 A1 | 1/2006 | Balasubramanian et al. |
| 2006/0028398 A1 | 2/2006 | Willmore |
| 2006/0050640 A1 | 3/2006 | Jin et al. |
| 2006/0053459 A1 | 3/2006 | Simerly et al. |
| 2006/0058003 A1 | 3/2006 | Lee |
| 2006/0069797 A1 | 3/2006 | Abdo et al. |
| 2006/0098593 A1 | 5/2006 | Edvardsen et al. |
| 2006/0101146 A1 | 5/2006 | Wang |
| 2006/0103508 A1 | 5/2006 | Sato |
| 2006/0133414 A1 | 6/2006 | Luoma et al. |
| 2006/0136963 A1 | 6/2006 | Oh et al. |
| 2006/0146009 A1 | 7/2006 | Syrbe et al. |
| 2006/0187964 A1 | 8/2006 | Li et al. |
| 2006/0198448 A1 | 9/2006 | Aissi et al. |
| 2006/0199537 A1 | 9/2006 | Eisenbach |
| 2006/0202809 A1 | 9/2006 | Lane et al. |
| 2006/0203805 A1 | 9/2006 | Karacali-Akyamac et al. |
| 2006/0206340 A1 | 9/2006 | Silvera et al. |
| 2006/0209787 A1 | 9/2006 | Okuda |
| 2006/0218298 A1 | 9/2006 | Knapp et al. |
| 2006/0222246 A1 | 10/2006 | Murai et al. |
| 2006/0223442 A1 | 10/2006 | Stephens |
| 2006/0233191 A1 | 10/2006 | Pirzada et al. |
| 2006/0236250 A1 | 10/2006 | Gargi |
| 2006/0256851 A1 | 11/2006 | Wang et al. |
| 2006/0268869 A1 | 11/2006 | Boers et al. |
| 2006/0270417 A1 | 11/2006 | Chi |
| 2006/0288008 A1 | 12/2006 | Bhattiprolu et al. |
| 2007/0004387 A1 | 1/2007 | Gadamsetty et al. |
| 2007/0008922 A1 | 1/2007 | Abhishek et al. |
| 2007/0016654 A1 | 1/2007 | Bowles et al. |
| 2007/0022195 A1 | 1/2007 | Kawano et al. |
| 2007/0037600 A1 | 2/2007 | Fukuda |
| 2007/0043550 A1 | 2/2007 | Tzruya |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0104215 A1 | 5/2007 | Wang et al. |
| 2007/0126715 A1 | 6/2007 | Funamoto |

(56) References Cited

U.S. PATENT DOCUMENTS

| | | |
|---|---|---|
| 2007/0141984 A1 | 6/2007 | Kuehnel et al. |
| 2007/0141988 A1 | 6/2007 | Kuehnel et al. |
| 2007/0157283 A1 | 7/2007 | Setlur et al. |
| 2007/0162945 A1* | 7/2007 | Mills .............................. 725/119 |
| 2007/0171910 A1 | 7/2007 | Kumar et al. |
| 2007/0182728 A1 | 8/2007 | Fujimori |
| 2007/0211041 A1 | 9/2007 | Lai et al. |
| 2007/0259662 A1 | 11/2007 | Lee et al. |
| 2007/0264988 A1 | 11/2007 | Wilson, Jr. et al. |
| 2007/0264991 A1 | 11/2007 | Jones et al. |
| 2007/0274400 A1 | 11/2007 | Murai et al. |
| 2007/0291636 A1 | 12/2007 | Rajagopal et al. |
| 2007/0292135 A1 | 12/2007 | Guo et al. |
| 2007/0299778 A1 | 12/2007 | Haveson et al. |
| 2008/0005348 A1 | 1/2008 | Kosiba et al. |
| 2008/0013658 A1 | 1/2008 | Lewis et al. |
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1 | 6/2008 | Khedouri et al. |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0094317 A1 | 4/2009 | Venkitaraman |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1* | 12/2009 | Harter, Jr. ...................... 725/35 |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1* | 5/2010 | Gelman et al. ............... 348/578 |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1* | 10/2010 | Go et al. ........................ 715/733 |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1 | 12/2010 | Athas et al. |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0149806 A1 | 6/2011 | Verma et al. |
| 2011/0157470 A1 | 6/2011 | Tsuruga et al. |
| 2011/0164058 A1 | 7/2011 | Lemay |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1 | 3/2012 | Sherwood et al. |
| 2012/0084670 A1 | 4/2012 | Momchilov |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0047189 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0227152 A1 | 8/2013 | Lee et al. |
| 2013/0234913 A1 | 9/2013 | Thangadorai et al. |
| 2013/0238702 A1 | 9/2013 | Sheth et al. |
| 2013/0246565 A1 | 9/2013 | Froelicher et al. |
| 2013/0246665 A1 | 9/2013 | Lee et al. |
| 2013/0272628 A1 | 10/2013 | Lee |
| 2013/0297936 A1 | 11/2013 | Khosravi et al. |
| 2013/0304794 A1 | 11/2013 | Verma et al. |
| 2014/0019653 A1 | 1/2014 | Amchislavsky et al. |
| 2014/0022146 A1 | 1/2014 | Thangadorai et al. |
| 2014/0096164 A1 | 4/2014 | Bei et al. |

(56) References Cited

U.S. PATENT DOCUMENTS

| | | | |
|---|---|---|---|
| 2014/0120829 A1 | 5/2014 | Bhamidipati et al. | |
| 2014/0210693 A1 | 7/2014 | Bhamidipati et al. | |
| 2014/0372620 A1 | 12/2014 | Vedula et al. | |

FOREIGN PATENT DOCUMENTS

| | | |
|---|---|---|
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |
| CN | 101002453 A | 7/2007 |
| CN | 101018330 A | 8/2007 |
| CN | 101083825 A | 12/2007 |
| CN | 101247249 A | 8/2008 |
| CN | 101247250 A | 8/2008 |
| EP | 1203080 A2 | 5/2002 |
| EP | 1206080 A1 | 5/2002 |
| EP | 1233326 A2 | 8/2002 |
| EP | 1235392 A1 | 8/2002 |
| EP | 1325591 A1 | 7/2003 |
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 A2 | 5/2006 |
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H08237628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007508783 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I234954 | 6/2005 |
| TW | I239179 | 9/2005 |
| TW | 200618653 | 6/2006 |
| TW | 200838310 A | 9/2008 |
| TW | 200943168 A | 10/2009 |
| WO | WO0184291 A1 | 11/2001 |
| WO | WO02010942 | 2/2002 |
| WO | 0223825 A1 | 3/2002 |
| WO | WO0249314 A2 | 6/2002 |
| WO | 03030451 A1 | 4/2003 |
| WO | 03061240 A1 | 7/2003 |
| WO | WO-03104834 A2 | 12/2003 |
| WO | 2004030351 A1 | 4/2004 |
| WO | 2004034646 A1 | 4/2004 |
| WO | 2004051962 A1 | 6/2004 |
| WO | WO-2005107187 A1 | 11/2005 |
| WO | WO-2005109781 A1 | 11/2005 |
| WO | WO2005122509 | 12/2005 |
| WO | 2006007352 A1 | 1/2006 |
| WO | 2006020304 A2 | 2/2006 |
| WO | WO2006135289 A1 | 12/2006 |
| WO | 2007009876 A1 | 1/2007 |
| WO | WO2007000757 | 1/2007 |
| WO | 2007013334 A1 | 2/2007 |
| WO | WO2007021269 | 2/2007 |
| WO | WO-2007033049 A2 | 3/2007 |
| WO | 2007098425 A1 | 8/2007 |
| WO | 2007133483 A1 | 11/2007 |
| WO | 2007140342 A2 | 12/2007 |
| WO | 2007140344 A2 | 12/2007 |

(56) References Cited

FOREIGN PATENT DOCUMENTS

| WO | 2008027724 A1 | 3/2008 |
|---|---|---|
| WO | 2008087713 A1 | 7/2008 |
| WO | 2009015322 A2 | 1/2009 |
| WO | 2009040918 A1 | 4/2009 |
| WO | 2010120878 A2 | 10/2010 |
| WO | 2010126727 A2 | 11/2010 |
| WO | 2011002141 A1 | 1/2011 |
| WO | 2011003089 A1 | 1/2011 |
| WO | 2012096546 A2 | 7/2012 |

OTHER PUBLICATIONS

Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Brandenburg, et al., AVTCore, RTCP for inter-destination media syncronization, Internet Draft, draft-ietf-avtcore-idms-092.txt, Oct. 31, 2011.
Doerffel T., "User manual iTALC—Intelligent Teaching and Learning with Computers Version 1.0.4", Jan. 29, 2008(Jan. 29, 2008), pp. 1-17, XP55025785, Retrieved from the Internet: URL:http://italc.sourceforge.net/italc-manual-2007-01-29.pdf [retrieved on Apr. 26, 2012] the whole document.
Euihyeok Kwon, et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE, Sep. 25.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002 (Apr. 28, 2002), pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
International Search Report and Written Opinion—PCT/US2010/060249, International Search Authority—European Patent Office—Mar. 8, 2011.
McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.
Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol. MCD, No. V1. 1. 1, Dec. 1, 2010 (Dec. 1, 2010), XP014061814, section 5.
Mihai Mitrea et al: "Novel approaches to 1-30 remote display representations: BiFS-based solution and its deployment within the FP7 MobiThin project", 87. MPEG Meeting; Feb. 2, 2009—Jun. 2, 2009; Lausanne; (Motion Picture Expert Group or ISO/IEC JTC1/SC29/WG11),, No. M16058, Jan. 29, 2009 (Jan. 29, 2009), XP030044655, sections 2 and 3.
Miller B., et al., "Mapping salutation architecture APIs to Bluetooth service discovery layer," Bluetooth White Paper, [Online} pp. 1-25, Jul. 1, 1999, XP002511956.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/m5740673(VS.85).aspx.
Myers, et al: "Collaboration Using Multiple PDAS Connected to a PC," Proceedings of the ACM Conference on Computer Supported Cooperative Work (CSCW), Nov 14, 1998, pp. 285-294, ISBN: 978-1-58113-009-6.

Nave I et al., "Games@large graphics streaming architecture", Consumer Electronics, 2008. ISCE 2008. IEEE International Symposium on, IEEE, Piscataway, NJ, USA, Apr. 14, 2008 (Apr. 14, 2008), pp. 1-4, XP031283619, ISBN: 978-1-4244-2422-1 abstract col. 2—col. 6.
Nordbotten, N.A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.
Schulzrinne, et al., "RTP: A Transport Protocol for Real-Time Applications", rfc3550.txt, Jul. 1, 2003, XP015009332, ISSN: 0000-0003.
Shoji Y., et al., "Research and Standardization activty for IEEE802.15.3c mmW WPAN: (2) Target applications and Usage Models", IEICE Tech. Rep., vol. 106, No. 555, RC52006-279, pp. 179-182, Feb. 2007.
Wenger et al., "RTP Payload Format for H.264 Video," Network Working Group, RFC 3984, Feb. 2005, 78 pp.
Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005 (Oct. 3, 2005), pp. 902-911, XP010890303.
Co-pending U.S. Appl. No. 10/236,657, filed Sep. 6, 2002.
Video Electronics Standards Association (VESA) Mobile Display Digital Interface Standard (MDDI), Jul. 2004.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Byungjoo Lee, U.S. Appl. No. 61/433,942, filed Jan 18, 2011.
Taiwan Search Report—TW096140444—TIPO—Sep. 16, 2013.
Taiwan Search Report—TW098111391—TIPO—Nov. 1, 2013.
Taiwan Search Report—TW099143795—TIPO—Jan. 10, 2014.
Casner, S., et al., "Compressing IP/UDP/RTP Headers for Low-Speed Serial Links," IETF Network Working Group, RFC 2508 (Feb. 1999).
Gentric., et al., "RTP Payload Format for MPEG-4 Streams", Internet Engineering Task Force, draft-ietf-avt-mpeg4-multisl-03.txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998, pp. 1-42.
DDJ., "Research on Windows Programming with Visual C++, Final Issue, Overcoming WIN32 Hook Processing in MFC Programming", Feb. 1996 issue (vol. 5,No. 2, No. 61 in all), Shoeisha Co., Ltd., Feb. 1, 1996, pp. 66-77.
International Preliminary Report on Patentability—PCT/US2013/020155, The International Bureau of WIPO—Geneva, Switzerland, Jul. 17, 2014.
Wikipedia entry for UPnP List of UPnP AV media sewers and clients (captured Aug. 20, 2010), pp. 1-10, Retrieved from the Internet < URL: web.archive.org/web/20100820133238/http://en.wikipedia.org/wiki/List_of UPnP_AV_media_servers_and_clients >, whole document.
Wikipedia entry of header (captured Aug. 30, 2010), 1 page, Retrieved from the Internet < URL: web.archive.org/web/20100830154156/http://en.wikipedia.org/wiki/Head_ (computing) >, whole document.
Hayakawa A., "Operate multiple machines by remote control software", VNCThing, MAC Power, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, pp. 212-219.
"Raster Graphics" Wikipedia. Wikimedia Foundation, Jan. 29, 2011, Web, Apr. 1, 2015.
Ryo Yamaichi, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.

\* cited by examiner

DECOMPOSED MULTI-STREAM (DMS) TECHNIQUES FOR VIDEO DISPLAY SYSTEMS

This Application claims the benefit of U.S. Provisional Application No. 61/286,287, filed on Dec. 14, 2009, the entire content of which is incorporated herein by reference.

TECHNICAL FIELD

The disclosure relates to video displays and, more particularly, to video display systems for generating, communicating and rendering a decomposed multi-stream (DMS).

BACKGROUND

Video displays are used in a wide range of devices. Such devices include, but are not limited to digital televisions, wireless communication devices, personal digital assistants (PDAs), laptop or desktop computers, workstations, digital cameras, video cameras, digital media players, video gaming devices, portable movie players, e-readers, tablet computers, cellular or satellite radio telephones, smartphones, and the like.

Video display systems often include a host device (such as a computer) that generates a stream of video content for a client device (such as the display). In many cases, the host device may include its own display, yet still communicate video data to the client device, which may include a larger display than the host device. Different techniques and standards are being developed to allow such video content to be communicated from the host device to the client device over a high speed wireless link so that both the host device and the client device can display the video content.

Some video display systems generate a stream of video content referred to as a signal composed stream (SCS). The SCS comprises one single video stream, although the video content may still include different areas that can sometimes appear to be different streams. In this case, a host device may generate the SCS, and a client device can receive the SCS from the host device and render the signal video stream in order to display the content. Essentially, with SCS, the host device sends frames of "screen shots" (e.g., the entire content of the display buffer). The screen shots could possibly include different windows of content, but the different windows of content in SCS are not separate streams, but are simply part of the screen shots.

In contrast to systems that generate SCS, other types of video display systems generate a stream of video content referred to as a decomposed multi-stream (DMS). The DMS comprises two or more different video streams of content, which may correspond to separate regions of a viewable area, or possibly overlapping regions within a viewable area. In this case, the host device may generate the DMS that comprises the two or more different video streams of content, and a client device can receive the DMS from the host device and render video on a display screen that includes the two or more different video streams of content included in the DMS. The host device may render the different streams of the DMS in the different areas of a screen, and in some cases, the different areas of the different streams within the DMS may overlap.

SUMMARY

This disclosure describes techniques that can improve the generation of a decomposed multi-stream (DMS) by a host device of a video display system and the display of a DMS by a client device of the video display system. The techniques may apply different frame rates to different streams within a DMS, and the frame rates may depend on the content within the different streams. For example, one stream within a DMS may comprise a sequence of full-motion video information, which may be rendered at a relatively high frame rate (such as 10-120 frames per second commonly used in video playback). However, another stream within the DMS may be associated with a background of the display, various graphic user interface control windows or elements, or a display window that includes non-video content (such as e-mail or a document). The second stream in the DMS may be rendered at a much slower frame rate than that used for the sequence of full-motion video information. Furthermore, if the different streams are associated with overlapping areas within a viewable area of a display screen, techniques can be applied to reduce the data of one or both streams in the region of the overlap.

Other techniques are also described that can improve DMS. The host device may comprise a computer device (such as a laptop computer, smartphone or other computer device) and the client device may comprise a wireless display used to render the same output as the computer device. DMS may be used to communicate data over a high speed wireless link so that both the host device (e.g., the computer device) and the client device (e.g., the wireless display) can display similar content. Given that the content itself may differ in the different streams, or may overlap within a viewable area of a display, this disclosure describes techniques for improving DMS. In order to generate the DMS at the host device, the host device may have access to the content from an application that generates the content, and not just access to the display buffers at the host device. Signal composed stream (SCS) techniques may be implemented as fall-back techniques for communicating data from the host device to the client device when DMS is impossible or undesirable, e.g., due to lack of access to the content from an application that generates the content.

In one example, this disclosure describes a method that comprises generating a DMS via a host device of a video display system, wherein the DMS defines first content in a first area of a display window and second content in a second area of the display window, wherein the first content defines a first frame rate in the DMS and the second display content defines a second frame rate in the DMS, the first frame rate being different than the second frame rate. The method also comprises communicating the DMS from the host device to a client device of the video display system.

In another example, this disclosure describes a method that comprises receiving a DMS at a client device of a video display system from a host device of the video display system, wherein the DMS defines first content in a first area of a display window and second content in a second area of the display window, wherein the first content defines a first frame rate in the DMS and the second display content defines a second frame rate in the DMS, the first frame rate being different than the second frame rate. The method also comprises rendering the first display content and the second display content on the client device.

In another example, this disclosure describes a host device of a video display system, the host device comprising a DMS generator that generates a DMS, wherein the DMS defines first content in a first area of a display window and second content in a second area of the display window, wherein the first content defines a first frame rate in the DMS and the second display content defines a second frame rate in the DMS, the first frame rate being different than the second frame rate. The host device also comprises a transport unit that communicates the DMS from the host device to a client device of the video display system.

In another example, this disclosure describes a client device of a video display system, the client device comprising a transport unit that receives a DMS from a host device, wherein the DMS defines first content in a first area of a display window and second content in a second area of the display window, wherein the first content defines a first frame rate in the DMS and the second display content defines a second frame rate in the DMS, the first frame rate being different than the second frame rate. The client device also comprises a display unit, and a DMS render unit that renders the first display content and the second display content on the display unit.

In another example, this disclosure describes a host device of a video display system, the host device comprising means for generating a DMS, wherein the DMS defines first content in a first area of a display window and second content in a second area of the display window, wherein the first content defines a first frame rate in the DMS and the second display content defines a second frame rate in the DMS, the first frame rate being different than the second frame rate, and means for communicating the DMS from the host device to a client device of the video display system.

In another example, this disclosure describes a client device of a video display system, the client device comprising means for receiving a DMS from a host device of the video display system, wherein the DMS defines first content in a first area of a display window and second content in a second area of the display window, wherein the first content defines a first frame rate in the DMS and the second display content defines a second frame rate in the DMS, the first frame rate being different than the second frame rate, and means for rendering the first display content and the second display content on the client device.

The techniques described in this disclosure may be implemented at least partially in hardware, possibly using aspects of software or firmware in combination with the hardware. If implemented in software or firmware, the software or firmware may be executed in one or more hardware processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor of a host device of a video display system, cause the host device to generate a DMS, wherein the DMS defines first content in a first area of a display window and second content in a second area of the display window, wherein the first content defines a first frame rate in the DMS and the second display content defines a second frame rate in the DMS, the first frame rate being different than the second frame rate, and communicate the DMS from a host device to a client device of the video display system.

In another example, this disclosure describes a computer-readable storage medium comprising instructions that upon execution in a processor of a client device of a video display system, cause the client device to upon receiving a DMS from a host device of the video display system, wherein the DMS defines first content in a first area of a display window and second content in a second area of the display window, wherein the first content defines a first frame rate in the DMS and the second display content defines a second frame rate in the DMS, the first frame rate being different than the second frame rate, render the first display content and the second display content on the client device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
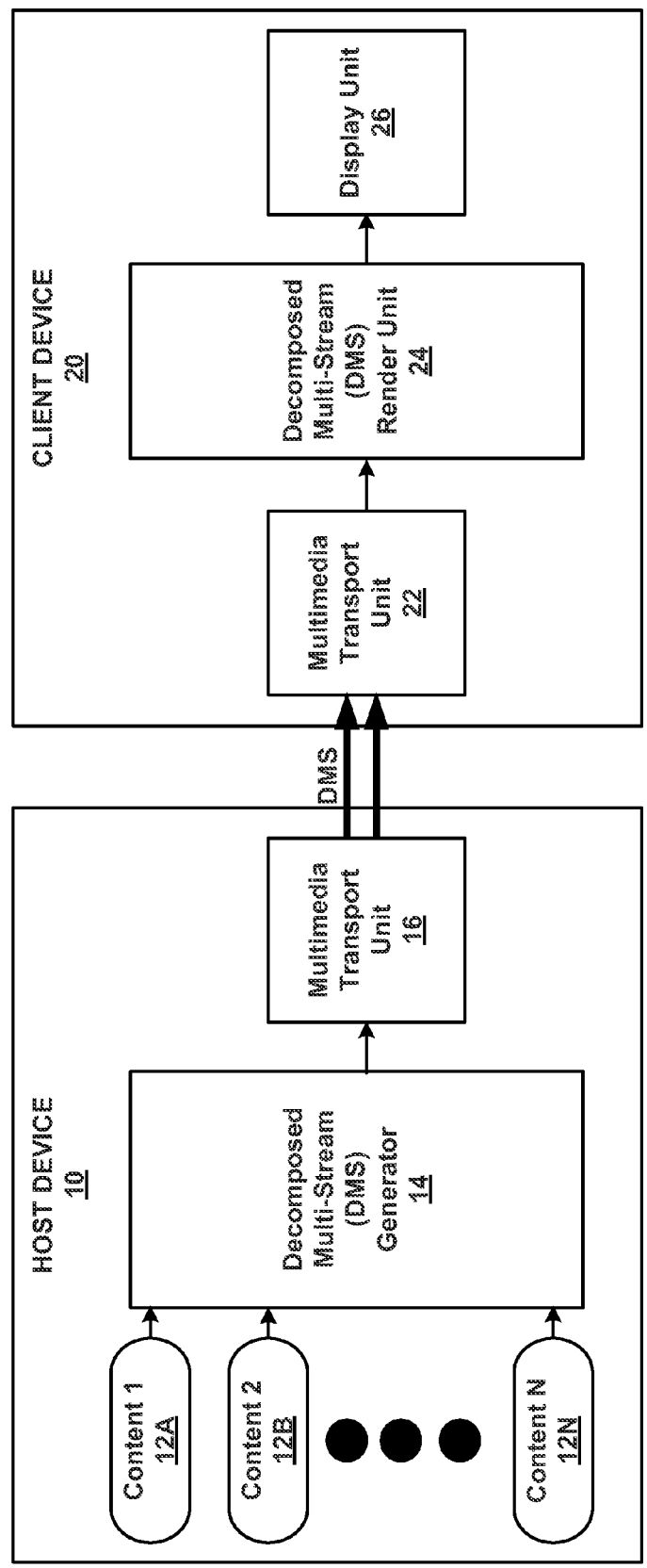
FIG. 1 is a block diagram illustrating an example system that may be used to implement the techniques of this disclosure.

This disclosure describes techniques that can improve the generation of a decomposed multi-stream (DMS) by a host device of the video display system and the display of a DMS by a client device of the video display system. A DMS refers to stream of data for a display that itself includes two or more different streams of content, which may correspond to separate regions of a viewable area, or possibly overlapping regions within a viewable area. The host device may generate the DMS that comprises the two or more different streams of content, and a client device can receive the DMS from the host device and render video on a display screen that includes the two or more different video streams of content included in the DMS. The host device may render the different streams of the DMS in the different areas of a screen, and in some cases, the different areas of the different DMS streams may overlap.

Some video display systems generate, in contrast to DMS streams, a stream of video content referred to as a signal composed stream (SCS). The SCS comprises one single video stream, which may be viewed as a screen shot in the host device. Essentially, with SCS, the host device sends the entire content of its display buffer to the client device. These so-called "screen shots" could possibly include different windows of content, but the different windows of content in SCS are not separate streams, but are simply part of the screen shots. If the host device displays two separate windows (one with full motion video and another with relatively static content), SCS would typically send screen shots at a frame rate corresponding to the full motion video. The SCS techniques can be a very inefficient way to send relatively static content along with the full motion video.

The techniques may apply different frame rates to different streams within a DMS, and the frame rates may depend on the content within the different streams. For example, one stream within a DMS may comprise a sequence of video information, which may be rendered at a relatively high frame rate (such as 10-120 frames per second commonly used in video playback). However, another stream within the DMS may be associated with a background of the display, various graphic user interface control windows or elements, or a display window that includes non-video content (such as e-mail or a document). The second stream or streams (e.g., streams that include relatively static content) may be rendered at a much slower frame rate than that used for the sequence of full-motion video information. Furthermore, if the different streams are associated with overlapping areas within a viewable area of a display screen, techniques can be applied to reduce the data of one or both streams in the region of the overlap. Many other techniques are also described that can improve DMS. As examples, the first frame rate may be 10-120 frames per second and approximately 30 frames per second may be sufficient for many streaming video applications. In contrast, the second frame rate may be between 1-10 frames per second, and approximately 4 frames per second may be sufficient for applications that do not generally include full-motion video.

The host device may comprise a computer device (such as a laptop computer or smartphone) and the client device may comprise a wireless display used to render the same output as the computer device. DMS may be used to communicate data over a high speed wireless link so that both the host device (e.g., the computer device) and the client device (e.g., the wireless display) can display similar content. Given that the content itself may differ in the different streams, or may overlap within a viewable area of a display, this disclosure provides techniques for improving DMS. In order to generate the DMS at the host device, the host device may have access to content from an application that generates the content, and not just access to the display buffers at the host device. SCS techniques may be implemented as fall-back techniques for communicating data from the host device to the client device when DMS is impossible or undesirable, e.g., due to lack of access to the content from an application that generates the content.

FIG. 1 is a block diagram illustrating an example video display system that may be used to implement the techniques of this disclosure. The system of FIG. 1 includes a host device 10 and a client device 20. In an illustrative example, host device 10 may comprise a laptop or smartphone and client device 20 may comprise a separate external display device used to render the same content as that rendered on host device. Host device 10 and client device 20 may communicate data via a short-range, high-speed wireless protocol. This example, however, is merely exemplary. Host device 10 and client device 20 could alternatively comprise any two computer devices that communicate data via DMS techniques. The communication link between host device 10 and client device 20 is typically a short-range wireless link. However, in other examples, the link between host device 10 and client device 20 could conform to any wired or wireless protocol, and could include intermediate devices, such as routers, switches or other networking devices.

Host device 10 may have access to different content (e.g., content 1 12A, content 2 12B, and content N 12N). The content 12 may be accessible to host device via display buffers, but may be separately accessible from one or more specific applications that render the content. As one example, content 12A may comprise content from a video playback application, and content 12B may comprise content from an e-mail application or word processing application.

Host device 10 includes a DMS generator 14 that generates a decomposed multi-stream (DMS), wherein the DMS defines first content in a first area of a display window and second content in a second area of the display window, wherein the first content defines a first frame rate in the DMS and the second display content defines a second frame rate in the DMS, the first frame rate being different than the second frame rate. For example, if content 12A comprises content from a video playback application, and content 12B comprises content from an e-mail application or word processing application, then content 12A may be encoded into a first stream of the DMS that has a higher frame rate than that used for content 12B.

Figure 2:
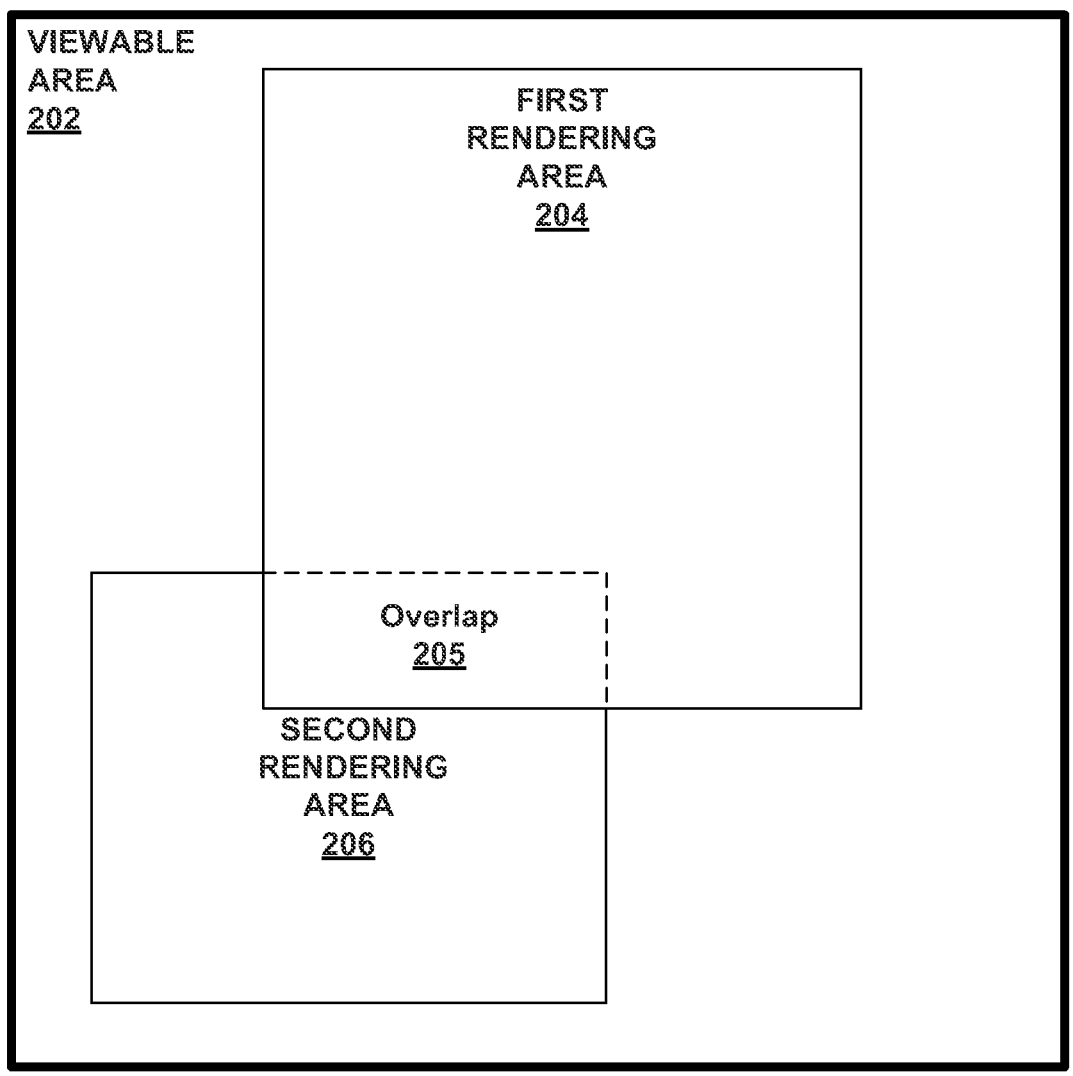
FIG. 2 is a conceptual illustration of a display screen that may include two separate areas of display content corresponding to different video streams of a decomposed multi-stream (DMS).

FIG. 2 is a conceptual illustration of a display screen including two separate areas of display content corresponding to different video streams of a DMS. As shown in FIG. 2, viewable area 202 includes a first rendering area 204 and a second rendering area 206. Furthermore, in this example, first rendering area 204 and second rendering area 206 both include an area of overlap 205. A DMS may include two separate streams for communicating the content of first rendering area 204 and second rendering area 206. A DMS may also include additional streams, i.e., greater than two streams.

First rendering area 204 may comprise a full-motion video sequence and may be coded in the DMS at 30 frames per second, or the like. Second rendering area 206 may comprise a window associated with a more static application, such as e-mail or a word processing application. Second rendering area 206 may alternatively or additionally include background data, graphic user interface elements (such as controls for the content in first rendering area 204).

Referring again to FIG. 1, host device 10 includes a multimedia transport unit 16 that communicates the DMS from host device 10 to a client device 20. Again, the DMS includes two or more different streams associated with different rendering areas (such as first rendering area 204 and second rendering area 206). Client device 20, likewise, includes a multimedia transport unit 22 for receiving the DMS from host device 10. In communicating the DMS from host device 10 to client device 20, the communication may apply send the streams at the frame rates that are defined in forming the DMS. That is, the DMS may be sent from host device 10 to client device 20 such that the first content is sent at a first frame rate the second content is sent at a second frame rate, the first frame rate being different than the second frame rate.

Transport units 16 and 22 may comprise wireless units capable of communicating wirelessly with one another. Transport units 16 and 22 may communicate over any wireless frequency used for wireless communication any may use any of a wide variety of wireless techniques or standards for such communication, including short-range or long range wireless standards, cell-phone standards, wi-fi, ultra wide band communication, white space communication, or the like. If white space or licensed television TV bands are used for communication, transport unit 16 may include sensing capabilities (or use other techniques such as global positioning) to ensure that frequencies are available for use.

At client device, DMS render unit 24 can be invoked to render the different streams of the DMS on display unit 26. As described in greater detail below, DMS render unit 24 may utilize different buffering techniques and different latency rules for different streams of content in the DMS. For example, full-motion video may require more buffering to ensure that the video is displayed without interruption, but may tolerate more latency or delay prior to rendering the full-motion video, relative to streams associated with other applications, such as e-mail. E-mail or other applications may not require the level of buffering needed for full-motion video (due to the use of a slower frame rate), but may not tolerate latency or delay in any changes to the display screen. For these or other reasons, DMS reader unit 24 may buffer the first content differently than the second content, and may apply different latency rules for display of the first content and display of the second content by display unit 26.

In accordance with this disclosure, DMS generator 14 of host device 10 may dynamically adjust the first frame rate associated with first rendering area 204 in the DMS, and dynamically adjust the second frame rate associated with second rendering area 206 in the DMS. These dynamic adjustments to one or both of the first and second frame rates may be based on the first content and the second content. As described in greater detail below, DMS generator 14 may intercept the first content from an application, but simply capture the second content from a display buffer in host device 10. In doing so, DMS generator 14 may also control (and may dynamically increase or reduce) a capture rate associated with capturing the second content from the display buffer. DMS generator 14 may optionally include an encoder for encoding one or more of the streams in the DMS, in which case DMS render unit 24 would include a reciprocal decoder.

As mentioned, first rendering area 204 and second rendering area 206 may include an overlapping area 205 (also called a region of overlap). To facilitate data reductions in the DMS and simplified decoding, DMS generator 14 may, in some examples, generate information in the DMS (e.g., syntax information) that identifies which of the first content or the second content is on top in the overlapping area. This syntax information may comprise z-ordering information or coordinates that can allow DMS render unit 24 to ascertain which of the first content or the second content is on top in the overlapping area 205. In this case, DMS 14 may also reduce or eliminate data for either the first content or the second content in overlapping area 205, wherein the reduced or eliminated data is below other data in the overlapping area.

In some cases, DMS generator 14 may include the ability to generate SCS that includes the first content and the second content directly from a display buffer, e.g., if it is impossible or impractical to intercept content from a specific application. In this case, DMS generator may determine that intercepting the first content or the second content from the application is not possible, and may generate an SCS that includes the first content and the second content directly from a display buffer at host device 10 in response to determining that intercepting the first content or the second content from the application is not possible. User input may also be used to define the DMS. For example, DMS generator 14 may be configured to adjust the DMS so as to only include one of the first content or the second content in response to user input.

Furthermore, DMS generator 14 may determine a bandwidth available between host device 10 and client device 20. The available bandwidth may define a data transfer rate that is available at any given time. DMS generator 14 may, in some examples, adjust one or both of the first frame rate and the second frame rate based on the bandwidth available. In addition or alternatively, DMS generator 14 may dynamically encode one or both of the first content and the second content based on the bandwidth available. DMS generator 14 may also dynamically encode one or both of the first content and the second content based on the type of content that is being communicated. In many cases, it may be desirable to encode content that is captured from display buffers as described herein. Content that is intercepted from an application may already be encoded. In some cases, content that is intercepted from an application could be transcoded (i.e., decoded and then re-encoded in a different encoding format).

In general, the phrase "single composed stream" (SCS) is used herein to refer to techniques where the entire display buffers transmitted end to end (e.g., from host device 10 to client device 20), in either compressed or uncompressed form. With SCS, partial display updates may also be transmitted end to end, in compressed or uncompressed form. In contrast, the phrase "decomposed multi-stream" (DMS) refers to a technique that passes both pre-compressed content (e.g., video) directly from an application (e.g., a media payer application) in addition to the rest of the display content from the display buffers. A number of standardized specifications are currently under development for DMS techniques, including "VESA Net2Display," and "USB-IF Display." Specifications that support SCS methods may include VESA Net2Display, USB-IF Display, and other commercial VNC systems.

DMS methods may define many advantages, such as quality preservation for pre-compressed content, and resource and power conservation on the host platform associated with host device 10. However, DMS has a number of drawbacks. These drawbacks may include the fact that DMS may impose additional requirements on client device 20, which can increase costs and complexities for client device 20. Such additional requirements for client device 20 to support DMS may include the ability to decode two or more video streams simultaneously and the ability to compose and render decoded output of two or more streams. The ability to compose and render decoded output of two or more streams may, in some cases, demand an ability to perform chroma-key and alpha-blending as part of the composition of multiple display surfaces. Furthermore, requirements for chroma-key and alpha-blending may become important when other content is dynamically overlaid on top of an area where full-motion video is being rendered. Examples of such dynamic content may include drop-down menus generated by user actions, dialog boxes and alerts generated by the operating system on host device 10. At times, for example, these or other items may be rendered by host device 10 and client device 20 directly on top of an area where a movie is being rendered. The techniques of this disclosure may simplify DMS in these instances and avoid needs for chroma-key and/or alpha-blending by simply using syntax information to identify which rendering area is on top in an overlapping area.

Many host device implementations may rely on high level application program interfaces (APIs) (e.g. a graphical driver interface (GDI)) to periodically capture the background surface even though it may be unnecessary capture and encode of the background display surface. Areas that are partly (or wholly) hidden by an overlaid full-motion video, for example, may be eliminated from the DMS so as to reduce the use of host device resources and reduce the amount of data transmitted between host device 10 and client device 20.

Also, for wireless touchscreen implementations, the capture of touch events at client device 20 may be desirable over the entire display screen, spanning the rendering locations of all the received streams in the DMS. Furthermore, DMS may fail when client device 20 does not support a specific media type of pre-compressed content. Many aspects of the media type, such as resolution, the specific type of encoding used, the color space used, the orientation, the aspect ratio, or other factors may cause DMS to fail if client device 20 does not support the media type.

DMS could also fail when host device 10 is unable to intercept the pre-compressed content, e.g., from a media player application. This can happen if the media player is implemented in a monolithic form and is not using a well-known media framework conducive to intercept. Also, DMS could fail when the combined throughput requirements (of the separate streams) exceed the available transmission link capacity (i.e., the available bandwidth) between host device 10 and client device 20. Channel conditions may arise at the start of a wireless display session, or dynamically at any point, during the course of a wireless display session. The techniques of this disclosure may provide solutions to these issues and problems with DMS explained above.

Systems that only use the SCS techniques may be forced to treat the entire display area as a single unit. As such, in this case, client device 20 may treat different display areas uniformly for latency, by implementing a common jitter buffer for playback. This may present a tradeoff between minimizing latency (and hence minimizing jitter buffering) for productivity and responsiveness for more static applications, versus enhancing the smoothness of full-motion video playback applications (by increasing jitter buffering). Also, systems that only use SCS techniques can be forced to apply uniform treatment for the entire display area, when trading off quality parameters such as compressed versus uncompressed data transmission. In this case, dynamic adaptation can be constrained and can be required to be applied uniformly across the entire display area.

Consistent with this disclosure, various requirements for a DMS client (i.e., client device 20) may be relaxed, e.g., for a low-cost client implementation. While the ability to decode two or more video streams simultaneously may still be needed at client device 20, the encode frame rate of the background surface may be reduced significantly to as to minimize the total decode frame rate. The reduction in frame rate for one of the streams within a DMS is discussed in greater detail below.

The ability to compose and render the decoded output of two or more streams may be simplified at client device 20 by only requiring relatively simple z-ordering over content in overlapping rendering areas. This can avoid blending operations and chroma-key applications at client device 20. The scheme may be supplemented to handle content that needs to be displayed on top of the area where full-motion video is being rendered, as follows. In one example, host device 10 may detect the presence (or subsequent removal) of content to be displayed on top of a full-motion video overlay surface. This detection may be done in a number of ways by host device 10, e.g., via intercept of display driver updates that provide rectangle coordinates of updates, or via scanning a full graphic driver interface (GDI)-capture buffer at strategic locations with knowledge of the coordinates of the full-motion video overlay surface. Furthermore, host device 10 may signal client device 20 via a control message (or other syntax element) so as to inform the client device of such z-ordering. Upon receipt of the control message from host device 10, client device 20 may control (in some cases swap) the z-order of two separate streams. This may cause the full-motion video content to be temporarily hidden while there is a user-interface alert to be displayed, but may be an acceptable limitation for a low-cost and relatively simple client device implementation.

For host device implementations that rely on high level APIs (e.g. a GDI) to capture the background surface periodically, the host platform overhead for capture and encode of the background display surface may be minimized in a number of different ways. In one example, while there is a full-motion video overlay surface active, the GDI capture rate may be significantly reduced (e.g. to 4 hertz). The impact of this lowered capture rate may reduce the frame rate, but may not be perceptible in most situations, since the surrounding display areas are mostly static (or typically change at a much lower rate relative to any full-motion video overlay surface). Furthermore, such benefits of reduced frame rate (and reduced capture rate) may be even more pronounced when the full-motion video overlay surface area is masked by GDI capture (as can be the case when there is hardware-accelerated decoding on the host device). The masked area within a region of overlap can be filled with null data or "black" during GDI capture, which may improves the encoding efficiency at the lowered capture rate. This "blacking" of masked regions of overlap may be synergistic with a lower GDI capture rate because no motion is generated in the "black" area where the full-motion video is being rendered, and in some cases, any encoder bit budget may be expended in the surrounding areas to improve video quality for a given bit budget.

In an extreme example, if host device 10 detects that the full-motion video overlay surface occupies the full display area (which may happen when a mediaplayer application is in "fullscreen" mode), the GDI capture rate may degenerate to 0 hertz. This degeneration of the GDI capture rate to 0 hertz may also be optionally simulated when a host device mediaplayer application is not in fullscreen mode, e.g., if the user chooses to not visualize the full user interface on the wireless display of the client device. This may be a suitable choice if the wireless display of the client device is a television (TV) screen in the case where only the full-motion overlay surface is desired to be visualized on the client device.

For a wireless touchscreen implementation, capture of touch events at client device 20 may be accomplished on the entire display screen, spanning the rendering locations of all the received DMS streams. An additional virtual window surface may be rendered by client device 20 congruent with the full display area. This virtual window surface may be a transparent window to the user so that it does not hide any of the actual display streams received and rendered. Touch screen capture (using standard operation system interfaces) may be performed on this virtual surface at client device 20, and may be scaled appropriately to the host device display screen size.

Host device 10, when implementing techniques described in this disclosure, may fallback to an SCS mode when client device 20 does not support the media type of the pre-compressed content. Aspects of media type may include resolution, the encoding used, the color space, the orientation, the aspect ratio, or other factors. Also, host device 10, when implementing techniques described in this disclosure, fallback to SCS mode when host device 10 is unable to intercept the pre-compressed content from the application (such as a media player application) used to render the content. This can happen, for example, if the application (such as a media player application) does not use a media framework known to host device 10 or the media is otherwise not conducive for intercept by host device 10.

When host device 10 detects that the combined throughput requirements (of all the DMS streams) exceed the available transmission link capacity (e.g., the available bandwidth) between host device 10 and client device 20, host device 10 may perform various operations. In one such example, host device 10 may lower the throughput budget for the background surface by adapting one or more parameters, such as the quantization parameter used in encoding, the frame rate, the bitrate, or other parameters. If this is still inadequate to fit both streams within the available transmission link capacity between host device 10 and client device 20, client device 20 may revert to SCS mode with a suitably degraded quantization parameter, frame rate, bitrate or other elements. Inadequate channel capacity conditions may arise at the start of a wireless display session, or dynamically during the course of the wireless display session.

Client device 20 may treat each of the received streams differently for latency. For example, client device 20 may implement a smaller jitter buffers for background surface stream relative to jitter buffers used for full motion video. Client device may also apply different latency rules to ensure that latency is not introduced for the background surface stream. Latency may be more tolerable for full motion video, and may be initially desirable to help avoid interruptions in the video playback later in the video sequence. In contrast to the smaller jitter buffers for background surface stream, client device 20 may implement a relatively large jitter buffer for the full-motion video overlay surface, to improve the smoothness of video playback applications.

An implementation of specific delays for the DMS may also be controlled by host device 10, e.g., via presentation-timestamps added for each stream within the DMS, which may be compensated uniquely by host device 10. Host device 10 may also select between a compressed mode and an uncompressed mode of transmission for the background surface, depending on a DMS state (i.e. whether there is current a full-motion video overlay surface active), and availability of transmission link capacity. For example, host device 10 may choose uncompressed mode at a lower frame rate whenever there is a full-motion video overlay surface active. In this case, the uncompressed mode transmissions for the background surface may be either the full surface screen shots, or partial updates to modify previous screen shots already received by client device 20. In either case, the screen shots or updates may be lightly compressed, e.g. using chroma-sub-sampling, run-length coding or other techniques.

Figure 3:
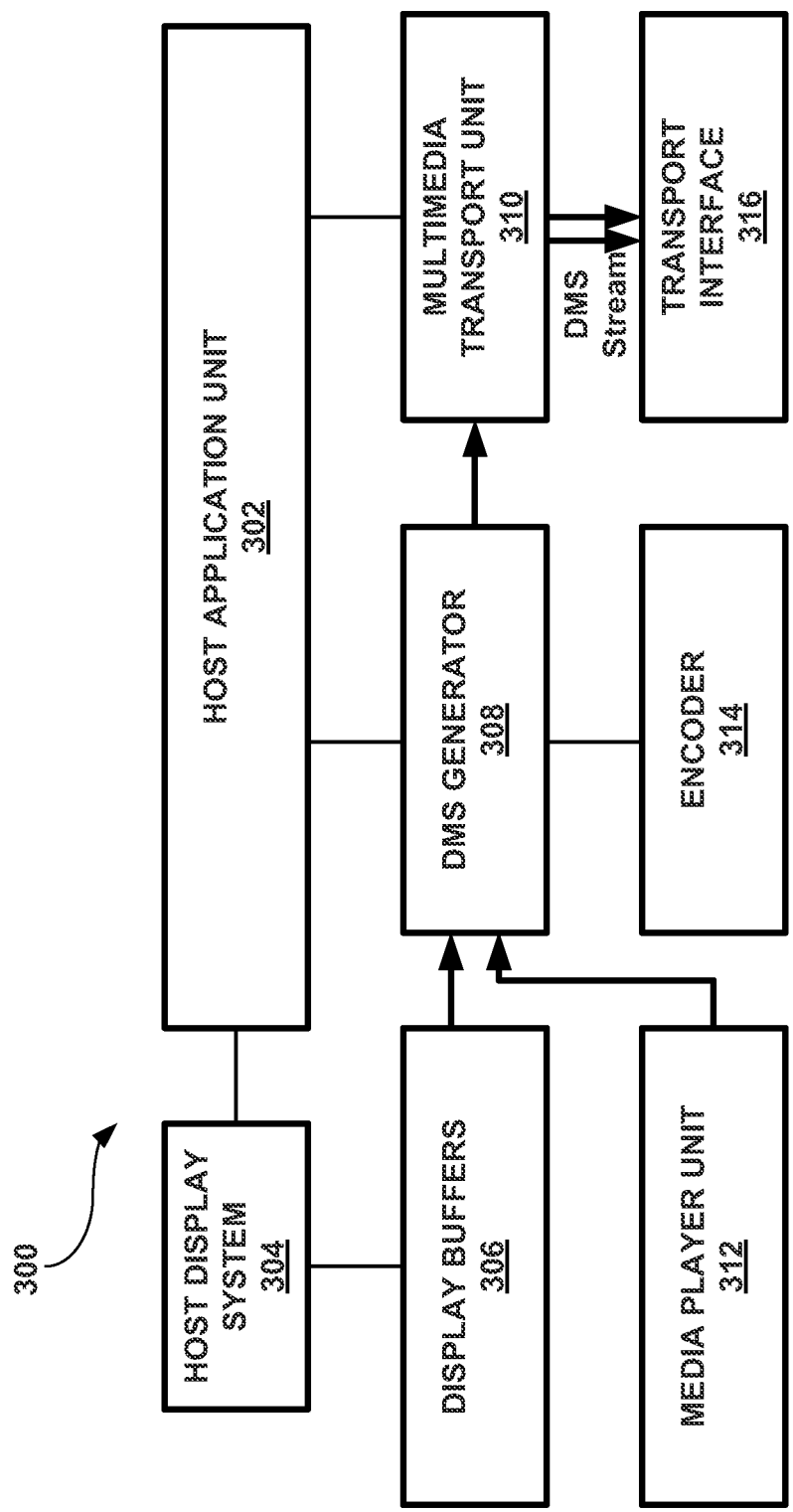
FIG. 3 is an exemplary block diagram of a host device consistent with one example of this disclosure.

FIG. 3 is a block diagram of a host device 300 that may correspond to host device 10 of FIG. 1. In this example, host device 300 includes a host application unit 302, which may comprise a host operating system operating on a processor. Host device 300 also includes a host display system 304, which may comprise a display and the software driver for the display on host device 300. Display buffers 306 may also form part of host display system 304, but are illustrated separately, as these may be accessed by DMS generator 308 as part of the generation of DMS. DMS generator 308 may correspond to DMS generator 12 of FIG. 1. Host device 300 also includes a multimedia transport unit 310, which may correspond to multimedia transport unit 14 of FIG. 1. Transport interface 316 may include one or more antennas on host device 300, as well as the air interface used for wireless communication. Host device 300 may include a media player unit 312, and DMS generator 308 may be capable of obtaining content directly from media player unit 312 (such as via an interrupt) for inclusion in the DMS. Host device 300 may optionally include an encoder 314 for encoding one or more of the streams included in the DMS.

Encoder 314 may comprise any video encoder, such as an encoder complying with ITU-H.263, ITU-H.264, ITU-H.265, or other public or proprietary video coding standards or techniques. In many cases, it may be desirable to invoke encoder 314 in order to encode content that is captured from display buffers 306. Content that is intercepted from media player unit 312 may already be encoded. In some cases, content that is intercepted from media player unit 312 could be transcoded by encoder 314 (i.e., decoded and then re-encoded in a different encoding format).

DMS generator 308 generates a DMS that defines first content in a first area of a display window and second content in a second area of the display window, wherein the first content defines a first frame rate in the DMS and the second display content defines a second frame rate in the DMS, the first frame rate being different than the second frame rate. The first content associated with the first frame rate may comprise video information received directly from media player unit 312. In this case, DMS generator 308 may issue an interrupt to media player unit 312 to instruct media player unit 312 to provide its video stream directly to DMS generator. Media player unit 312 may also provide its video stream to host display system 304 for display by a display device associated with host device 300.

In addition to this first stream received directly from media player unit 312, DMS generator 308 may also receive a second stream from display buffers 306, which is essentially an SCS. DMS generator 308 may generate a DMS that includes both the first and second streams, and may generate the different streams of the DMS to have different frame rates. For example, the first stream received directly from media player unit 312 may define a relatively high frame rate (such as 10-30 frames per second) common with video playback. The second stream received from display buffers 306 may define a relatively slow frame rate (such as 1 to 10 frames per second). If areas of the first content and the second content overlap, DMS generator 308 may use techniques of this disclosure to avoid sending data for both streams in the areas of overlap. Instead, DMS generator 308 may generate DMS information to identify which stream is on top, and may eliminate data from the stream that is on the bottom (particularly in the area of overlap). In this case, generating the DMS may include reducing or eliminating data for either the first content or the second content in the overlapping area, wherein the reduced or eliminated data is below other data in the overlapping area.

In some cases, DMS generator 308 may also dynamically reduce or dynamically increase its capture rate associated with capturing the second content from display buffers 306, and these adjustments may be based on the first content and/or the second content. Encoder 314 may be invoked to encoder either the first content of the DMS, the second content of the DMS, or both the first and second content. Encoder 314 may encode the data according to ITU-H.263, ITU-H.264, ITU-H.265, or other public or proprietary video coding standards or techniques.

In some cases, DMS generator 308 may determine that intercepting the first content from media player unit 312 is not possible, and in this case, may generate an SCS that includes the first content and the second content directly from display buffers 306 in response to determining that intercepting the first content or the second content from the application is not possible. In this case, SCS may be considered a fall-back to DMS in the case where the content is not available from an application and is only available from display buffers 306.

In different examples, the first content comprises a video sequence and the second content comprises output of a non-video application. In some cases, the second content may comprise graphical user interface elements that form a shell around the video sequence of the first content. In other cases, the second content may comprise graphical user interface control elements or separate graphical user interface windows that may overlap with the first content. In still other cases, the second content may comprise a separate window associated with a different application, such as an e-mail or word processing application. If desired, the DMS may be adjusted to only include one of the first content or the second content in response to user input.

In still other examples, DMS generator 308 may consider other factors (such as available bandwidth) in generating the DMS. For example, DMS generator 308 may determine a bandwidth available between host device 300 and a client device, and may adjust one or both of the first frame rate and the second frame rate based on the bandwidth available. If encoder 314 is invoked by DMS generator 308 as part of the DMS generation process so as to create encoded content in the DMS, DMS generator 308 may also adjust encoding parameters as part of the DMS generation process. As one example, DMS generator 308 may determine a bandwidth available between host device 300 and a client device, and may cause encoder 314 to dynamically encode one or both of the first content and the second content based on the bandwidth available.

The DMS may be forwarded to multimedia transport unit 310 of host device 300 for communication to a client device (not shown) via a transport interface 316. Multimedia transport unit 310 and transport interface 316 may use any of a wide variety of wireless techniques or standards for such communication, including short-range or long range wireless standards, cell-phone standards, wi-fi, ultra wide band communication, white space communication, or the like. If white space or licensed television TV bands are used for communication, multimedia transport unit 310 may include sensing capabilities (or use other techniques such as global positioning) to ensure that frequencies are available on transport interface 316.

Figure 4:
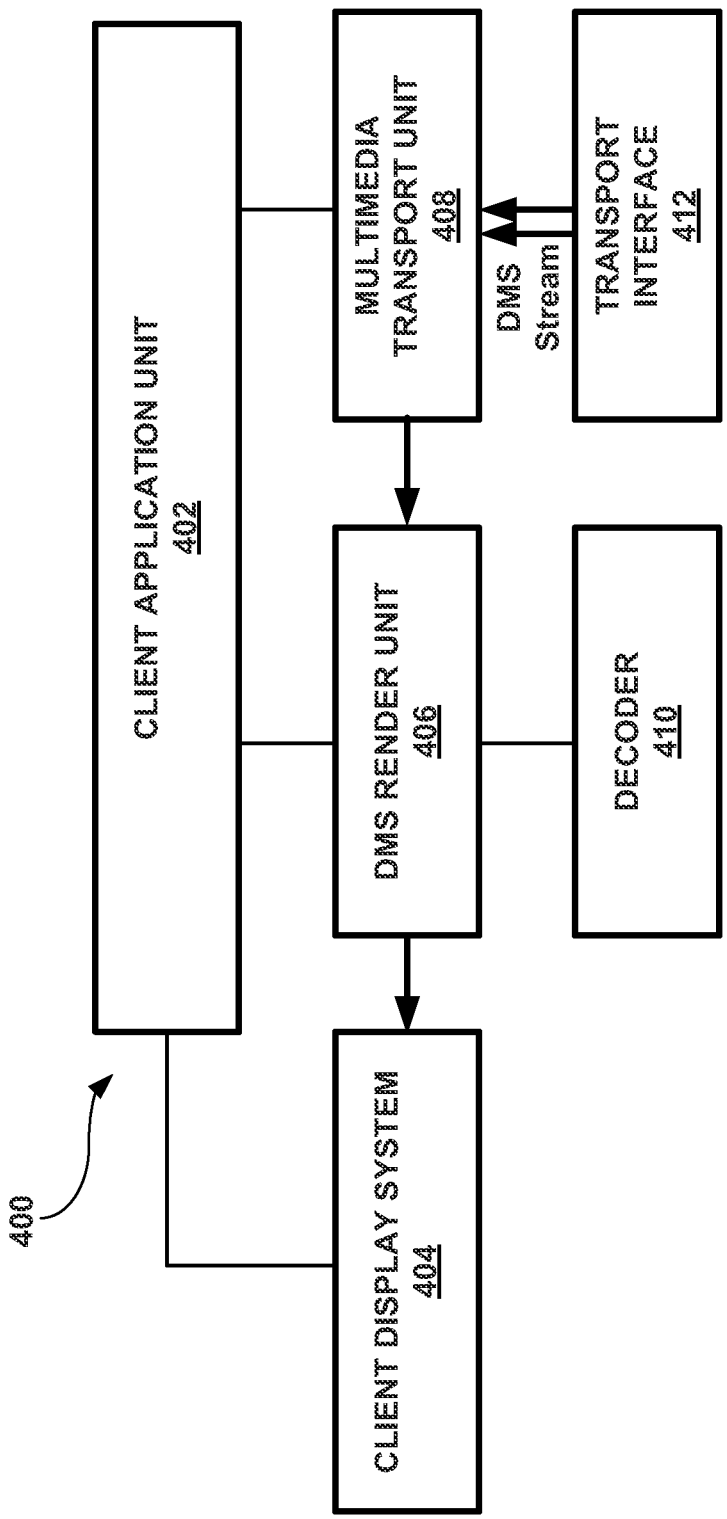
FIG. 4 is an exemplary block diagram of a client device consistent with one example of this disclosure.

FIG. 4 is a block diagram of a client device 400 that may correspond to client device 20 of FIG. 1. In this example, client device 400 includes a client application unit 402 which may comprise a client operating system operating on a processor. Client device 400 also includes a client display system 404, which may comprise a display and the software driver for the display on client device 400. DMS render unit 406 may correspond to DMS render unit 24 of FIG. 1. Client device 400 also includes a multimedia transport unit 408, which may correspond to multimedia transport unit 22 of FIG. 1. Transport interface 412 may include one or more antennas on client device 400, as well as the air interface used for wireless communication from the host device (not shown in FIG. 4). Client device 400 may optionally include a decoder 410 for decoding one or more of the streams included in the DMS. Decoder 410 may comprise a decoder complying with ITU-H.263, ITU-H.264, ITU-H.265, or other public or proprietary video coding standards or techniques.

Client device 400 receives a DMS stream from a host device via transport interface 412 and multimedia transport unit 408. As explained in this disclosure, the DMS defines first content in a first area of a display window and second content in a second area of the display window, wherein the first content defines a first frame rate in the DMS and the second display content defines a second frame rate in the DMS, the first frame rate being different than the second frame rate. DMS render unit 406 renders the first display content and the second display content on client display system 404 of client device 400. Again, in one example, the first content comprises a video sequence and the second content comprises output of a non-video application. In another example, the first content comprises a video sequence and the second content comprises a graphical user interface element. In these examples, the first frame rate may be greater than the second frame rate.

In some cases, it may be desirable for DMS render unit 406 and/or client display system 404 to implement different types of buffering and latency rules for the different content in the DMS. For example, client display system 404 may include display buffers, and may buffer the first content differently than the second content. Furthermore, client display system 404 may different latency rules for display of the first content and the display of the second content. For example, full-motion video may require more buffering to ensure that the video is displayed without interruption, but may tolerate more latency or delay prior to rendering the full-motion video, relative to streams associated with other applications, such as e-mail. E-mail or other applications may not require the level of buffering needed for full-motion video (due to the use of a slower frame rate), but may not tolerate latency or delay in any changes to the display screen. For these or other reasons, DMS reader unit 406 and/or client display system 404 may buffer the first content differently than the second content, and may apply different latency rules for display of the first content and display of the second content by client display system 404.

Figure 5:
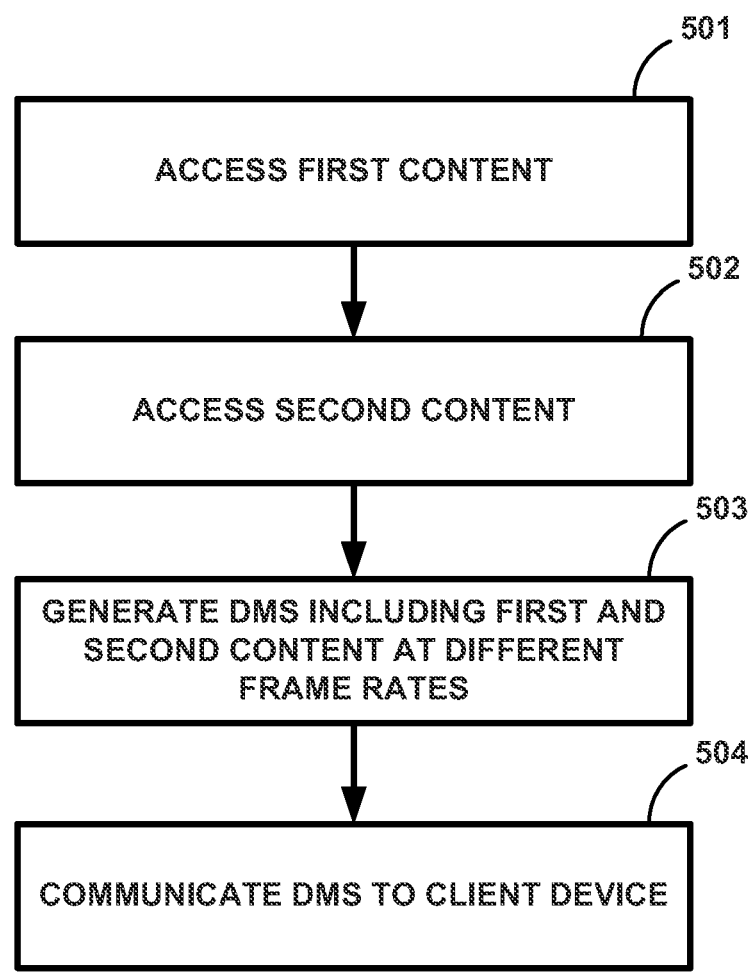
FIGS. 5-8 are flow diagrams illustrating techniques that may be implemented by a host device consistent with this disclosure.

FIG. 5 is a flow diagram illustrating a technique for generating a DMS. FIG. 5 will be described from the perspective of host device 300, although similar techniques may be applied by other devices. As shown in FIG. 5, DMS generator 308 of host device 300 accesses first content (501) from media player unit 312 and accesses second content (502) from display buffers 306. DMS generator 308 generates a DMS including the first content and the second content at different frame rates (503), and communicates the DMS to a client device (504), such as via multimedia transport unit 310 and transport interface 316. Additional content (i.e., additional streams) may also be included in the DMS in some cases.

Figure 6:
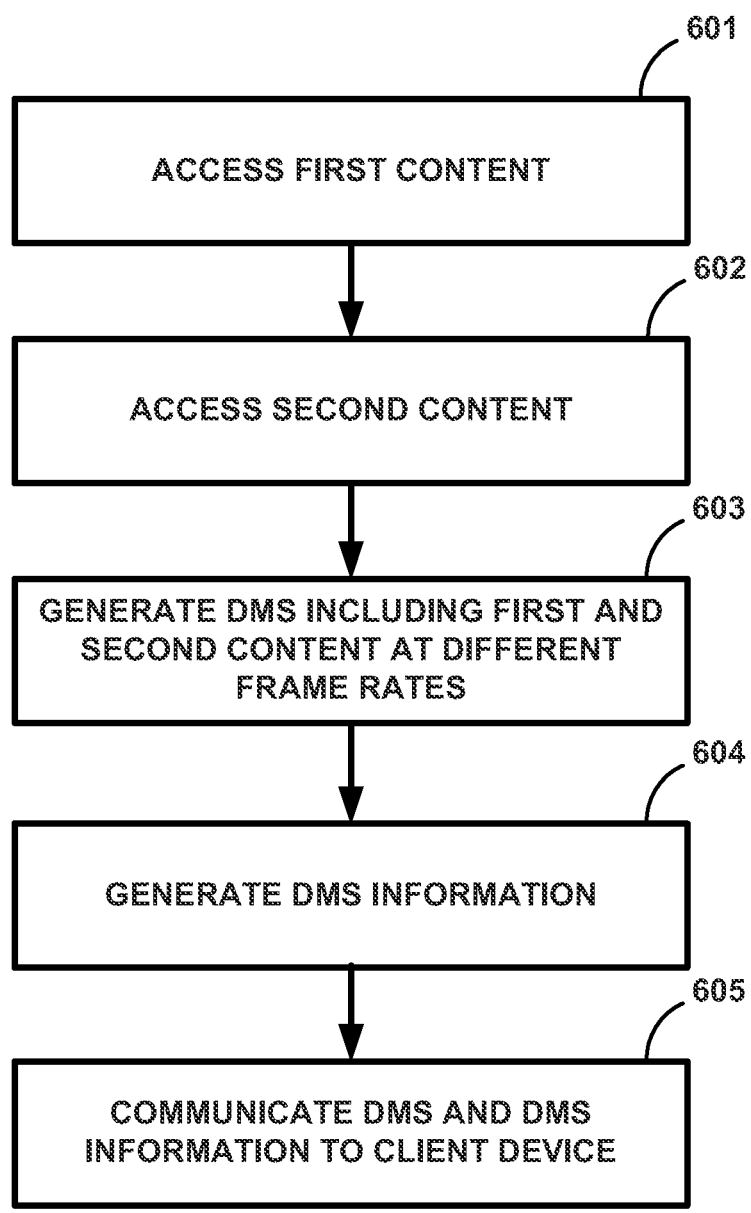

FIG. 6 is another flow diagram illustrating a technique for generating a DMS. FIG. 6 will also be described from the perspective of host device 300, although similar techniques may be applied by other devices. As shown in FIG. 6, DMS generator 308 of host device 300 accesses first content (601) from media player unit 312 and accesses second content (602) from display buffers 306. DMS generator 308 generates a DMS including the first content and the second content at different frame rates (603). In addition, DMS generator 308 generates DMS information (604), which may comprise syntax information (e.g., metadata) that instructs a client device how to reconstruct the first content and the second content. For example, in the case of overlap between the first content and the second content, the DMS information may comprise z-coordinate information for the area of overlap. In this case, the stream within the DMS that is below the other stream in the area of overlap may be encoded as null data or black data so as to reduce the amount of data in that area where something is overlaid by the other stream. Host device 300 then communicates the DMS and DMS information to a client device (605), such as via multimedia transport unit 310 and transport interface 316.

Figure 7:
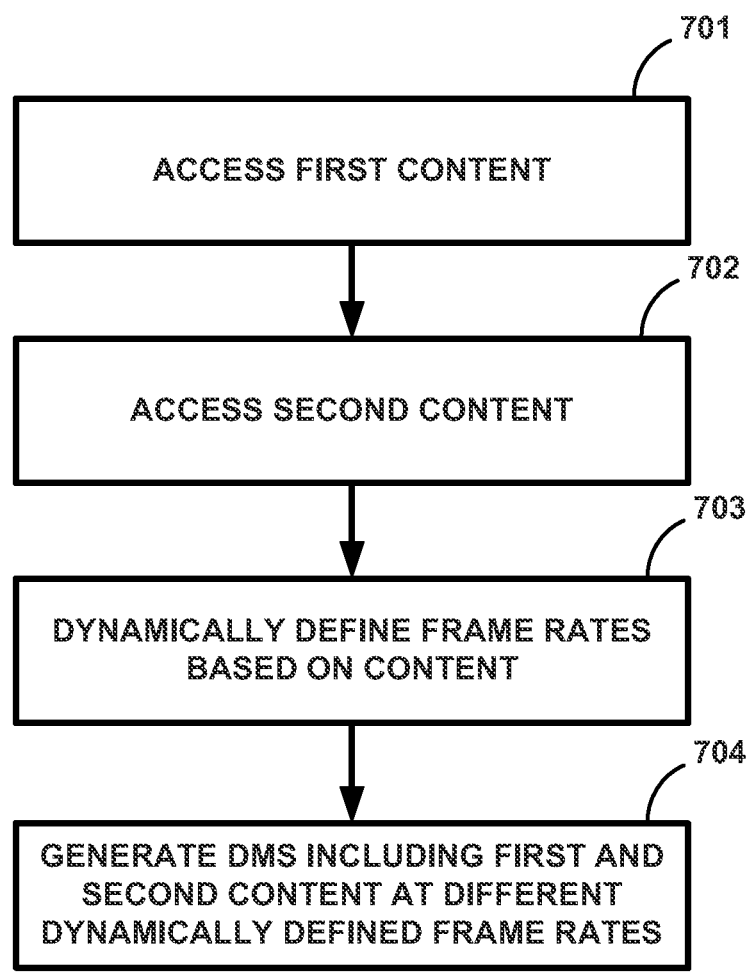

FIG. 7 is another flow diagram illustrating a technique for generating a DMS. FIG. 7 will also be described from the perspective of host device 300, although similar techniques may be applied by other devices. As shown in FIG. 7, DMS generator 308 of host device 300 accesses first content (701) from media player unit 312 and accesses second content (702) from display buffers 306. DMS generator 308 dynamically defines frame rates for the first and second content based on the content itself (703). For example, DMS generator 308 may assign a higher frame rate to any video information and a slower frame rate to streams that are more static. In some cases, the frame rates may be determined by the place of access. For example, video information from media player unit 312 may be assigned a higher frame rate than any data from display buffers 306. Data from other applications, such as from e-mail applications or word processing applications, may likewise be assigned a slower frame rate than video data from media player unit 312 or another source. In any case, DMS generator 308 generates a DMS including the first and second content at the different dynamically defined frame rates (704). The different rates may be dynamic in the sense that the rates may change if the content changes. Such changes may be based on the source of the content or the actual type of content at any given instance.

Figure 8:
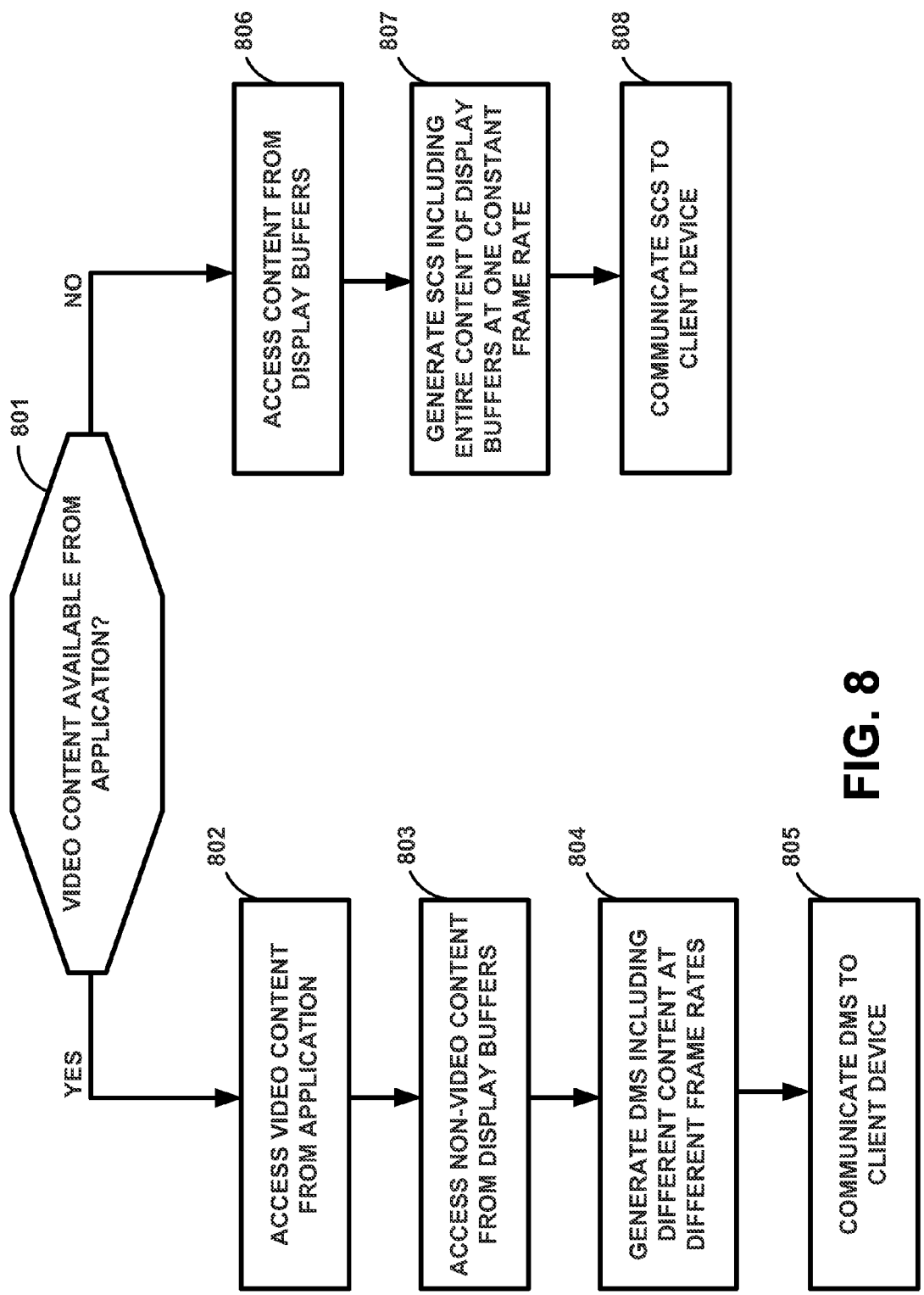

FIG. 8 is a flow diagram illustrating a technique for generating a DMS or SCS in different scenarios. FIG. 8 will also be described from the perspective of host device 300, although similar techniques may be applied by other devices. As shown in FIG. 8, DMS generator 308 of host device 300 determines whether video content is available from an application associated with media player unit 312 (801). If not ("no" 801), DMS generator may default to an SCS technique. In this case, ("no" 801), DMS generator accesses content from display buffers 306 (806), and generates an SCS including the entire content of display buffers 306 at one constant frame rate (807). Host device 300 then communicates the SCS to a client device (808), such as via multimedia transport unit 310 and transport interface 316.

If DMS generator 308 of host device 300 determines that video content is available from an application associated with media player unit 312 ("yes" 801), DMS generator may implement a DMS technique. In this case, ("yes" 801), DMS generator 308 accesses video content from an application associated with media player unit 312 (802), and separately accesses non-video content from display buffers 306 (803). DMS generator 308 generates a DMS including the different content at the different frame rates (804), and communicates the DMS to a client device (805), such as via multimedia transport unit 310 and transport interface 316.

Figure 9:
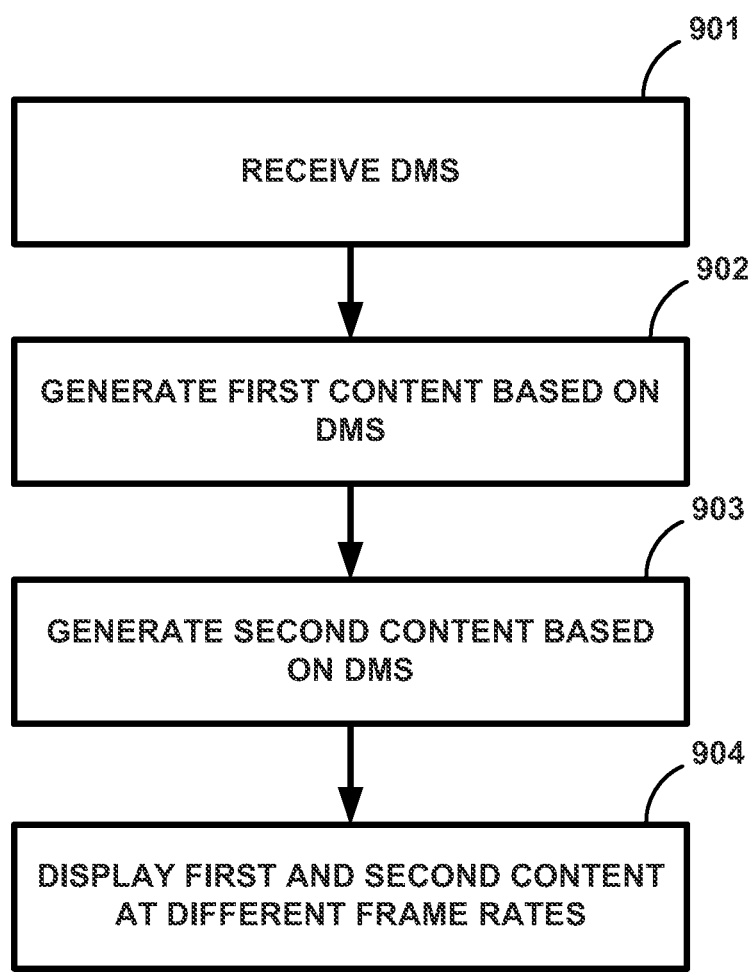
FIGS. 9-11 are flow diagrams illustrating techniques that may be implemented by a client device consistent with this disclosure.

FIG. 9 is a flow diagram illustrating a technique for processing a DMS at a client device. FIG. 9 will be described from the perspective of client device 400, although similar techniques may be applied by other devices. As shown in FIG. 9, DMS render unit 406 receives a DMS (901). For example, the DMS may be communicated from a host device and received at client device 400 via transport interface 412 and multimedia transport unit 408. Multimedia transport unit 408 forwards the DMS to DMS render unit 406. DMS render unit 406 generates first content based on the DMS (902) and generates second content based on the DMS (903). DMS render unit 406 causes client display system 404 to display the first and second content at different frame rates (904), which may be defined by the DMS. This display of the two or more streams may optionally include any of the other techniques described herein, such as the techniques for handling overlay of the different streams in an overlapping area.

Figure 10:
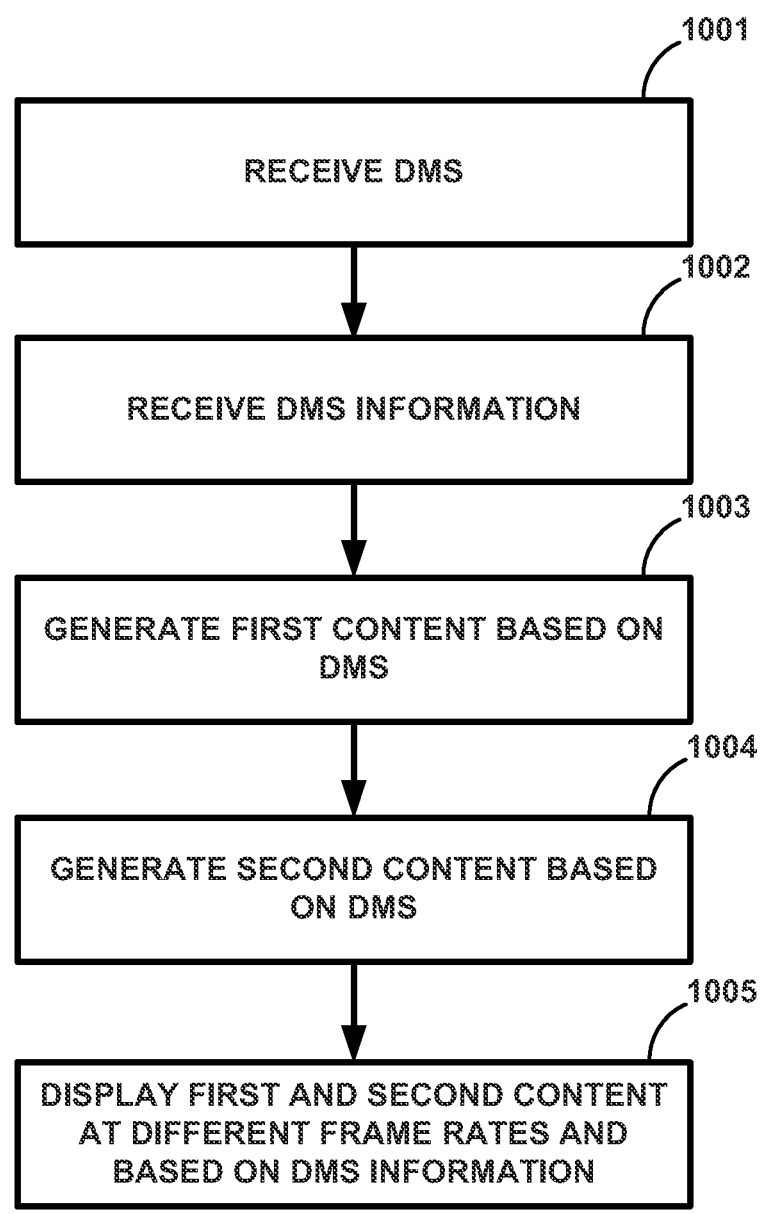

FIG. 10 is a flow diagram illustrating a technique for processing a DMS at a client device. FIG. 10 will also be described from the perspective of client device 400, although similar techniques may be applied by other devices. As shown in FIG. 10, DMS render unit 406 receives a DMS (1001), and also receives DMS information (1002), which may comprise metadata or other side or syntax information associated with the DMS.

The DMS and DMS information may be communicated from a host device and received at client device 400 via transport interface 412 and multimedia transport unit 408. Multimedia transport unit 408 forwards the DMS and DMS information to DMS render unit 406. DMS render unit 406 generates first content based on the DMS (1003) and generates second content based on the DMS (1004). DMS render unit 406 causes client display system 404 to display the first and second content at different frame rates (1005) and based on the DMS information. The different frame rates may be defined by the DMS itself. The DMS information may comprise information that defines the interaction of the first and second streams. For example, the DMS information may comprise Z-coordinate (i.e., depth) information that defines which of the first and second content within the DMS stream is overlaid over the other content. The Z-coordinate (i.e., depth) information may define the relative depths of different streams so as to define which content is on top and which content is underneath for any areas of overlap. The content that is underneath other content in an area of overlap may be nulled or blacked in the DMS stream, so as to improve throughput. Since the data is below other data, it is blocked from view anyway, so nulling or blacking such data in the DMS stream will not be observed by the user at client device 400.

Figure 11:
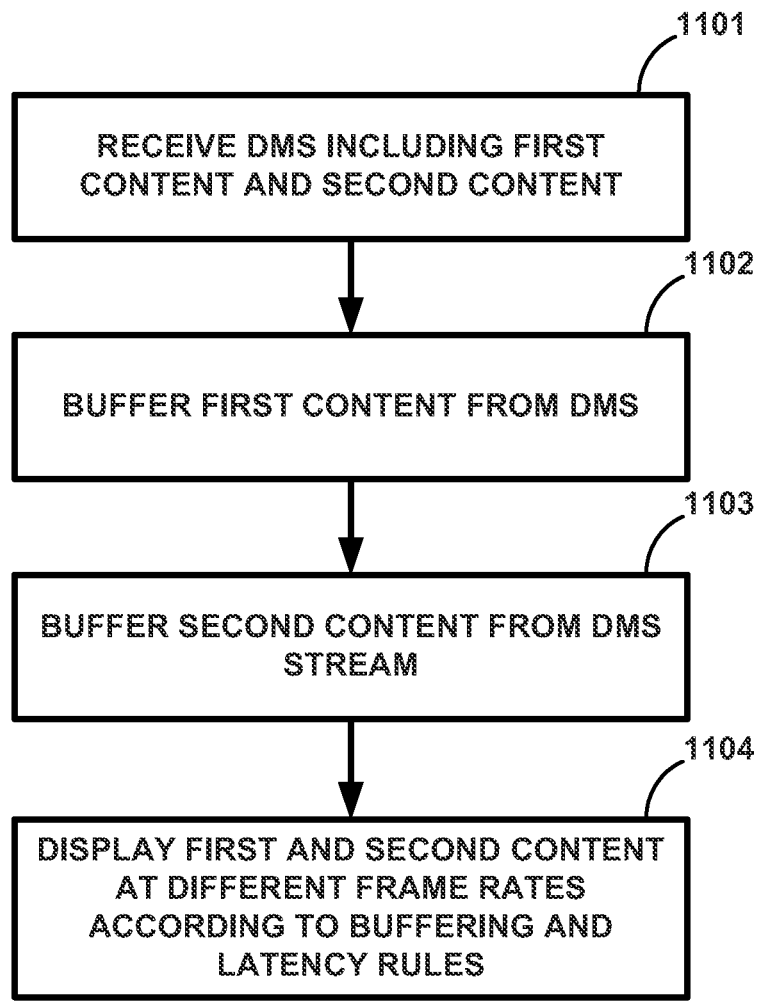

FIG. 11 is a flow diagram illustrating a technique for processing a DMS at a client device. FIG. 11 will also be described from the perspective of client device 400, although similar techniques may be applied by other devices. As shown in FIG. 11, DMS render unit 406 receives a DMS (1101) including first and second content. For example, the DMS may be communicated from a host device and received at client device 400 via transport interface 412 and multimedia transport unit 408. Multimedia transport unit 408 forwards the DMS to DMS render unit 406. DMS render unit 406 causes client display system 404 to buffer the first content from the DMS (1102) and to buffer the second content from the DMS (1103). The buffers used by client display system 404 may depend on the content. For example, larger buffers may be used for real time video data, while smaller buffers (possibly defining less latency than the larger buffers) may be used for other types of data, such as graphical data or data associated with other types of applications such as e-mail applications or word processing applications. Accordingly, client display system 404 displays the first and second content at different frame rates according to buffering and latency rules applied to the different content (1104). These buffering and latency rules may differ for such different types of content so as to improve the rendering of full-motion video information, which may tolerate longer latency and require more buffering to ensure smoothness in the output video relative to graphical elements or data from other types of applications. The streams for graphical elements or data from other types of applications, for example, may require shorter latency (i.e., more responsiveness) but may not need more extensive levels of buffering that are desirable for full-motion video sequences.

In still other examples, the frame rate associated with background data (e.g., data in the second stream) may be specifically reduced when real-time video is included in the first stream of the DMS. This technique may improve the use of limited resources in the client device and improve video rendering in such cases were resources are limited. To implement such techniques, GDI capture rates associated with the capture of data in display buffers for the second stream of the DMS at the host device may be reduced when real-time video is included in the first stream of the DMS.

In still other examples, data may be included in the DMS as yet another stream (e.g., a third stream) for providing a touch screen overlay that spans the first and second contents in the DMS stream. In this case, the touch screen overlay may comprise a transparent window for providing touch screen capture or feedback at the client device. Other techniques for facilitating touch screen capture in host and client devices of a display system may also be used.

It should be noted that the discussion above has focused on a DMS that includes two streams. However, the techniques of this disclosure could be extended to a DMS that includes additional streams, i.e., greater than two streams. The DMS could include a first stream, a second stream, a third stream, a fourth stream, and so forth. The frame rates of some or all of the different streams in the DSM could be defined in a dynamic manner, as described herein. The various other techniques could also be used to address issues of overlap or other features with respect to more than two streams.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

The invention claimed is:

1. A method comprising:
generating a decomposed multi-stream (DMS) via a host device of a video display system, wherein the DMS defines first content in a first area of a display window and second content in a second area of the display window, wherein the first area and the second area each include an overlapping area, wherein the first content defines a first video frame rate in the DMS and the second display content defines a second video frame rate in the DMS, the first video frame rate being different than the second video frame rate;
generating information in the DMS that identifies which of the first content or the second content is on top in the overlapping area;
communicating the DMS from the host device to a client device of the video display system; and
adjusting the DMS to only include one of the first content or the second content in response to user input.

2. The method of claim 1, further comprising dynamically adjusting the first video frame rate and the second video frame rate in the DMS based on the first content and the second content.

3. The method of claim 1, wherein generating the DMS includes intercepting the first content from an application and capturing the second content from a display buffer in the host device.

4. The method of claim 3, further comprising dynamically reducing a capture rate associated with capturing the second content from the display buffer based on the first content and the second content.

5. The method of claim 1, wherein generating the DMS includes encoding the second content.

6. The method of claim 1, wherein generating the DMS includes reducing or eliminating data for either the first content or the second content in the overlapping area, wherein the reduced or eliminated data is below other data in the overlapping area.

7. The method of claim 1, wherein generating the DMS includes intercepting the first content or the second content from an application.

8. The method of claim 7, further comprising:
determining that intercepting the first content or the second content from the application is not possible; and generating a signal composed stream (SCS) that includes the first content and the second content directly from a display buffer at the host device in response to determining that intercepting the first content or the second content from the application is not possible.

9. The method of claim 1, wherein the first content comprises a video sequence and the second content comprises output of a non-video application.

10. The method of claim 9, wherein the first video frame rate is greater than the second video frame rate.

11. The method of claim 1, wherein the first content comprises a video sequence and the second content comprises a graphical user interface element.

12. The method of claim 1, further comprising:
determining a bandwidth available between the host device and the client device; and
adjusting one or both of the first video frame rate and the second video frame rate based on the bandwidth available.

13. The method of claim 1, further comprising:
determining a bandwidth available between the host device and the client device; and
dynamically encoding one or both of the first content and the second content based on the bandwidth available.

14. The method of claim 1, further comprising dynamically encoding one or both of the first content and the second content.

15. A method comprising:
receiving a decomposed multi-stream (DMS) at a client device of a video display system from a host device of the video display system, wherein the DMS defines first content in a first area of a display window and second content in a second area of the display window, wherein the first area and the second area each include an overlapping area, wherein the DMS comprises information that identifies which of the first content or the second content is on top in the overlapping area, wherein the first content defines a first video frame rate in the DMS and the second display content defines a second video frame rate in the DMS, the first video frame rate being different than the second video frame rate;
rendering the first display content and the second display content on the client device; and
rendering only one of the first content or the second content in response to user input.

16. The method of claim 15, wherein the first content comprises a video sequence and the second content comprises output of a non-video application.

17. The method of claim 16, wherein the first video frame rate is greater than the second video frame rate.

18. The method of claim 15, wherein the first content comprises a video sequence and the second content comprises a graphical user interface element.

19. The method of claim 15, further comprising:
buffering the first content differently than the second content in the client device.

20. The method of claim 19, further comprising applying different latency rules for display of the first content by the client device and display of the second content by the client device.

21. A host device of a video display system, the host device comprising:
a decomposed multi-stream (DMS) generator that generates a DMS, wherein the DMS defines first content in a first area of a display window and second content in a second area of the display window, wherein the first area and the second area each include an overlapping area, wherein the first content defines a first video frame rate in the DMS and the second display content defines a second video frame rate in the DMS, the first video frame rate being different than the second video frame rate, and wherein the DMS generator generates information in the DMS that identifies which of the first content or the second content is on top in the overlapping area and adjusts the DMS to only include one of the first content or the second content in response to user input; and
a transport unit that communicates the DMS from the host device to a client device of the video display system.

22. The host device of claim 21, wherein the DMS generator dynamically adjusts the first video frame rate and the second video frame rate in the DMS based on the first content and the second content.

23. The host device of claim 21, wherein the DMS generator intercepts the first content from an application and captures the second content from a display buffer in the host device.

24. The host device of claim 23, wherein the DMS generator dynamically reduces a capture rate associated with capturing the second content from the display buffer based on the first content and the second content.

25. The host device of claim 23, wherein the DMS generator uses an encoder to encode the second content in the DMS.

26. The host device of claim 21, wherein the DMS generator reduces or eliminates data for either the first content or the second content in the overlapping area, wherein the reduced or eliminated data is below other data in the overlapping area.

27. The host device of claim 21, wherein the DMS generator intercepts the first content or the second content from an application.

28. The host device of claim 27, wherein the DMS generator:
determines that intercepting the first content or the second content from the application is not possible; and
generates a signal composed stream (SCS) that includes the first content and the second content directly from a display buffer at the host device in response to determining that intercepting the first content or the second content from the application is not possible.

29. The host device of claim 21, wherein the first content comprises a video sequence and the second content comprises output of a non-video application.

30. The host device of claim 29, wherein the first video frame rate is greater than the second video frame rate.

31. The host device of claim 21, wherein the first content comprises a video sequence and the second content comprises a graphical user interface element.

32. The host device of claim 21, wherein the DMS generator:
determines a bandwidth available between the host device and the client device; and
adjusts one or both of the first video frame rate and the second video frame rate based on the bandwidth available.

33. The host device of claim 21, wherein the DMS generator:
determines a bandwidth available between the host device and the client device; and
dynamically encodes one or both of the first content and the second content based on the bandwidth available.

34. The host device of claim 21, wherein the DMS generator dynamically encodes one or both of the first content and the second content.

35. A client device of a video display system, the client device comprising:
- a transport unit that receives a decomposed multi-stream (DMS) from a host device, wherein the DMS defines first content in a first area of a display window and second content in a second area of the display window, wherein the first area and the second area each include an overlapping area, wherein the DMS comprises information that identifies which of the first content or the second content is on top in the overlapping area, wherein the first content defines a first video frame rate in the DMS and the second display content defines a second video frame rate in the DMS, the first video frame rate being different than the second video frame rate;
- a display unit; and
- a DMS render unit that renders the first display content and the second display content on the display unit, wherein the DMS render renders only one of the first content or the second content in response to user input.

36. The client device of claim 35, wherein the first content comprises a video sequence and the second content comprises output of a non-video application.

37. The client device of claim 36, wherein the first video frame rate is greater than the second video frame rate.

38. The client device of claim 35, wherein the first content comprises a video sequence and the second content comprises a graphical user interface element.

39. The client device of claim 35, wherein the display unit includes buffers that are configured to buffer the first content differently than the second content.

40. The client device of claim 35, wherein the render unit is configured to apply different latency rules for display of the first content by the display unit, and display of the second content by the display unit.

41. A non-transitory computer-readable storage medium comprising instructions that upon execution in a processor of a host device of a video display system, cause the host device to:
- generate a decomposed multi-stream (DMS), wherein the DMS defines first content in a first area of a display window and second content in a second area of the display window, wherein the first area and the second area each include an overlapping area, wherein the first content defines a first video frame rate in the DMS and the second display content defines a second video frame rate in the DMS, the first video frame rate being different than the second video frame rate;
- generate information in the DMS that identifies which of the first content or the second content is on top in the overlapping area;
- communicate the DMS from a host device to a client device of the video display system; and
- adjusts the DMS to only include one of the first content or the second content in response to user input.

42. A non-transitory computer-readable storage medium comprising instructions that upon execution in a processor of a client device of a video display system, cause the client device to:
- upon receiving a decomposed multi-stream (DMS) from a host device of the video display system, wherein the DMS defines first content in a first area of a display window and second content in a second area of the display window, wherein the first area and the second area each include an overlapping area, wherein the DMS comprises information that identifies which of the first content or the second content is on top in the overlapping area, wherein the first content defines a first video frame rate in the DMS and the second display content defines a second video frame rate in the DMS, the first video frame rate being different than the second video frame rate,
- render the first display content and the second display content on the client device, and
- render only one of the first content or the second content in response to user input.

43. A host device of a video display system, the host device comprising:
- means for generating a decomposed multi-stream (DMS), wherein the DMS defines first content in a first area of a display window and second content in a second area of the display window, wherein the first area and the second area each include an overlapping area, wherein the first content defines a first video frame rate in the DMS and the second display content defines a second video frame rate in the DMS, the first video frame rate being different than the second video frame rate;
- means for generating information in the DMS that identifies which of the first content or the second content is on top in the overlapping area;
- means for communicating the DMS from the host device to a client device of the video display system; and
- means for adjusting the DMS to only include one of the first content or the second content in response to user input.

44. A client device of a video display system, the client device comprising:
- means for receiving a decomposed multi-stream (DMS) from a host device of the video display system, wherein the DMS defines first content in a first area of a display window and second content in a second area of the display window, wherein the first area and the second area each include an overlapping area, wherein the DMS comprises information that identifies which of the first content or the second content is on top in the overlapping area, wherein the first content defines a first video frame rate in the DMS and the second display content defines a second video frame rate in the DMS, the first video frame rate being different than the second video frame rate;
- means for rendering the first display content and the second display content on the client device; and
- means for rendering only one of the first content or the second content in response to user input.

* * * * *